(12) United States Patent
Tanimoto

(10) Patent No.: US 8,499,083 B2
(45) Date of Patent: Jul. 30, 2013

(54) RELAY DEVICE AND COMMUNICATION SYSTEM

(75) Inventor: Yoshifumi Tanimoto, Kyoto (JP)

(73) Assignee: Murata Kikai Kabushiki Kaisha, Kyoto-shi (JP)

(*) Notice: Subject to any disclaimer, the term of this patent is extended or adjusted under 35 U.S.C. 154(b) by 0 days.

(21) Appl. No.: 13/341,711

(22) Filed: Dec. 30, 2011

(65) Prior Publication Data

US 2012/0102205 A1    Apr. 26, 2012

Related U.S. Application Data

(63) Continuation of application No. 11/723,466, filed on Mar. 20, 2007.

(30) Foreign Application Priority Data

Mar. 29, 2006  (JP) .................. 2006-090690
Mar. 29, 2006  (JP) .................. 2006-090691
Mar. 29, 2006  (JP) .................. 2006-090692

(51) Int. Cl.
*G06F 15/16* (2006.01)
*G06F 15/173* (2006.01)

(52) U.S. Cl.
USPC .......................... 709/227; 709/223

(58) Field of Classification Search
USPC ................................................ 709/227
See application file for complete search history.

(56) References Cited

U.S. PATENT DOCUMENTS

| | | | |
|---|---|---|---|
| 5,224,205 A | 6/1993 | Dinkin et al. | |
| 5,535,375 A | 7/1996 | Eshel et al. | |
| 5,848,134 A | 12/1998 | Sekiguchi et al. | |
| 5,884,312 A | 3/1999 | Dustan et al. | |
| 6,061,796 A | 5/2000 | Chen et al. | |
| 6,111,883 A | 8/2000 | Terada et al. | |

(Continued)

FOREIGN PATENT DOCUMENTS

| | | |
|---|---|---|
| CN | 1481112 A | 3/2004 |
| EP | 1054547 A2 | 11/2000 |

(Continued)

OTHER PUBLICATIONS

Notification of Reason for Refusal dated Apr. 15, 2009, issued in corresponding Japanese Patent Application No. 2006-090691.

(Continued)

*Primary Examiner* — Firmin Backer
*Assistant Examiner* — James Edwards
(74) *Attorney, Agent, or Firm* — Westerman, Hattori, Daniels & Adrian, LLP

(57) ABSTRACT

A relay device requests a status notification of another relay device to a server device. When the relay device is notified that the other relay device is under a logged-out status, the relay device stands by. When the relay device is notified that the other relay device has logged in, the relay device transmits a connection request to the server device. The server device relays the connection request to the other relay device. A response is transmitted from the other relay device to the server device, and further relayed to the relay device. Accordingly, a TCP connection is established between the relay device and the other relay device. A communication device connected to a different network can transmit and receive data to and from the relay device via the other relay device.

2 Claims, 15 Drawing Sheets

U.S. PATENT DOCUMENTS

| | | |
|---|---|---|
| 6,145,084 A | 11/2000 | Zuili et al. |
| 6,178,427 B1 | 1/2001 | Parker |
| 6,215,877 B1 | 4/2001 | Matsumoto |
| 6,222,536 B1 | 4/2001 | Kihl et al. |
| 6,226,692 B1 | 5/2001 | Miloushev et al. |
| 6,237,023 B1 | 5/2001 | Yoshimoto |
| 6,324,574 B1 | 11/2001 | Gong |
| 6,336,141 B1 * | 1/2002 | Fujiyama et al. ............ 709/224 |
| 6,538,773 B1 | 3/2003 | Brossman et al. |
| 6,546,488 B2 | 4/2003 | Dillon et al. |
| 6,564,261 B1 | 5/2003 | Gudjonsson et al. |
| 6,574,656 B1 | 6/2003 | Nagaoka et al. |
| 6,594,246 B1 | 7/2003 | Jorgensen |
| 6,636,513 B1 | 10/2003 | Nishikawa et al. |
| 6,650,631 B1 | 11/2003 | Benash et al. |
| 6,754,212 B1 | 6/2004 | Terada et al. |
| 6,757,365 B1 | 6/2004 | Bogard |
| 6,765,686 B2 | 7/2004 | Maruoka |
| 6,766,373 B1 | 7/2004 | Beadle et al. |
| 6,889,256 B1 | 5/2005 | Palevich et al. |
| 6,898,641 B1 | 5/2005 | Kobayashi |
| 6,938,042 B2 | 8/2005 | Aboulhosn et al. |
| 6,950,879 B2 | 9/2005 | Zhou |
| 6,988,199 B2 | 1/2006 | Toh et al. |
| 7,000,248 B2 | 2/2006 | Mizukoshi |
| 7,110,393 B1 | 9/2006 | Tripathi et al. |
| 7,120,927 B1 | 10/2006 | Beyda et al. |
| 7,139,811 B2 | 11/2006 | Lev Ran et al. |
| 7,152,111 B2 | 12/2006 | Allred et al. |
| 7,174,378 B2 | 2/2007 | Yoon et al. |
| 7,181,542 B2 | 2/2007 | Tuomenoksa et al. |
| 7,191,195 B2 | 3/2007 | Koyama et al. |
| 7,200,642 B2 | 4/2007 | Hultgren et al. |
| 7,206,088 B2 | 4/2007 | Tanimoto |
| 7,257,638 B2 | 8/2007 | Celik et al. |
| 7,299,275 B2 | 11/2007 | Tsukidate et al. |
| 7,412,489 B2 | 8/2008 | Nowacki et al. |
| 7,574,523 B2 | 8/2009 | Traversat et al. |
| 7,624,175 B1 | 11/2009 | Schlesener et al. |
| 7,647,388 B2 * | 1/2010 | Kato ............................ 709/219 |
| 7,660,809 B2 | 2/2010 | Cortright et al. |
| 7,701,954 B2 | 4/2010 | Rabenko et al. |
| 7,702,726 B1 | 4/2010 | Grabelsky et al. |
| 7,774,495 B2 | 8/2010 | Pabla et al. |
| 7,813,299 B2 | 10/2010 | Yumoto et al. |
| 7,860,978 B2 | 12/2010 | Oba et al. |
| 8,065,418 B1 * | 11/2011 | Abuan et al. ................. 709/227 |
| 2001/0044819 A1 * | 11/2001 | Gong ............................ 709/202 |
| 2001/0047414 A1 | 11/2001 | Yoon et al. |
| 2002/0023143 A1 | 2/2002 | Stephenson et al. |
| 2002/0029276 A1 | 3/2002 | Bendinelli et al. |
| 2002/0032616 A1 | 3/2002 | Suzuki et al. |
| 2002/0056003 A1 | 5/2002 | Goswami |
| 2002/0073182 A1 | 6/2002 | Zakurdaev et al. |
| 2002/0095506 A1 | 7/2002 | Tanimoto |
| 2002/0118398 A1 | 8/2002 | Tanimoto |
| 2002/0143855 A1 | 10/2002 | Traversat et al. |
| 2002/0143922 A1 | 10/2002 | Tanimoto |
| 2002/0143956 A1 * | 10/2002 | Tanimoto ...................... 709/227 |
| 2002/0143957 A1 | 10/2002 | Tanimoto |
| 2002/0143960 A1 | 10/2002 | Goren et al. |
| 2002/0146002 A1 | 10/2002 | Sato |
| 2002/0152299 A1 | 10/2002 | Traversat et al. |
| 2002/0156875 A1 | 10/2002 | Pabla |
| 2003/0021232 A1 | 1/2003 | Duplaix et al. |
| 2003/0055741 A1 | 3/2003 | Yamamoto |
| 2003/0097456 A1 | 5/2003 | Huh et al. |
| 2003/0140637 A1 | 7/2003 | Masui et al. |
| 2003/0144872 A1 | 7/2003 | Masui et al. |
| 2004/0068524 A1 | 4/2004 | Aboulhosn et al. |
| 2004/0073610 A1 | 4/2004 | Terada et al. |
| 2004/0083385 A1 | 4/2004 | Ahmed et al. |
| 2004/0107272 A1 | 6/2004 | Manukyan |
| 2004/0162871 A1 | 8/2004 | Pabla et al. |
| 2004/0172395 A1 | 9/2004 | Edelstein et al. |
| 2004/0243703 A1 | 12/2004 | Demmer et al. |
| 2004/0255048 A1 | 12/2004 | Lev Ran et al. |
| 2004/0267939 A1 * | 12/2004 | Yumoto et al. ............... 709/227 |
| 2005/0114436 A1 | 5/2005 | Betarbet |
| 2005/0144289 A1 | 6/2005 | Yoshiuchi et al. |
| 2005/0216523 A1 | 9/2005 | Sakaguchi et al. |
| 2005/0256909 A1 | 11/2005 | Aboulhosn et al. |
| 2005/0281251 A1 | 12/2005 | Yumoto et al. |
| 2005/0287998 A1 | 12/2005 | Tonouchi |
| 2006/0020695 A1 | 1/2006 | Tantek et al. |
| 2006/0083171 A1 | 4/2006 | Tanaike et al. |
| 2006/0101064 A1 | 5/2006 | Strong et al. |
| 2006/0117076 A1 | 6/2006 | Spencer et al. |
| 2006/0149771 A1 | 7/2006 | Kojima et al. |
| 2006/0187902 A1 | 8/2006 | Birch et al. |
| 2006/0206616 A1 | 9/2006 | Brown |
| 2006/0256771 A1 | 11/2006 | Yarlagadda |
| 2006/0259553 A1 | 11/2006 | Kawakita |
| 2006/0282540 A1 | 12/2006 | Tanimoto |
| 2007/0019545 A1 | 1/2007 | Alt et al. |
| 2007/0022477 A1 | 1/2007 | Larson |
| 2007/0081530 A1 | 4/2007 | Nomura et al. |
| 2007/0106795 A1 | 5/2007 | Gilfix et al. |
| 2007/0174428 A1 * | 7/2007 | Lev Ran et al. ............... 709/218 |
| 2007/0192434 A1 | 8/2007 | Kodama et al. |
| 2007/0201493 A1 | 8/2007 | Yamada et al. |
| 2007/0211713 A1 | 9/2007 | Koshino et al. |
| 2007/0214281 A1 | 9/2007 | Celik et al. |
| 2007/0274329 A1 | 11/2007 | Takeyoshi et al. |
| 2008/0098088 A1 | 4/2008 | Tamano et al. |
| 2009/0067410 A1 | 3/2009 | Sterman et al. |
| 2009/0177573 A1 | 7/2009 | Beadle et al. |
| 2010/0241711 A1 | 9/2010 | Ansari et al. |
| 2012/0140659 A1 * | 6/2012 | Furukawa et al. ............ 370/252 |

FOREIGN PATENT DOCUMENTS

| | | |
|---|---|---|
| EP | 1139631 A1 | 10/2001 |
| EP | 1 331 587 A2 | 7/2003 |
| EP | 1526471 A1 | 4/2005 |
| EP | 1657939 A1 | 5/2006 |
| EP | 1667382 A1 | 6/2006 |
| EP | 1940126 A2 | 7/2008 |
| EP | 1942634 A1 | 7/2008 |
| EP | 1990974 A2 | 11/2008 |
| GB | 2350269 A | 11/2000 |
| GB | 2411541 A | 8/2005 |
| JP | 56-025880 A | 3/1981 |
| JP | 61-225957 A | 10/1986 |
| JP | 10-69412 A | 3/1989 |
| JP | 4-105143 A | 4/1992 |
| JP | 6-090236 A | 3/1994 |
| JP | 7-121422 A | 5/1995 |
| JP | 7-162448 A | 6/1995 |
| JP | 7-319784 A | 12/1995 |
| JP | 9-168055 A | 6/1997 |
| JP | 9-214486 A | 8/1997 |
| JP | 09-282216 A | 10/1997 |
| JP | 9-288608 A | 11/1997 |
| JP | 10-116293 A | 5/1998 |
| JP | 10-126440 A | 5/1998 |
| JP | 10-154118 A | 6/1998 |
| JP | 10-177548 A | 6/1998 |
| JP | 11-212871 A | 8/1999 |
| JP | 11-234270 A | 8/1999 |
| JP | 11-272534 A | 10/1999 |
| JP | 11-313059 A | 11/1999 |
| JP | 2000-59465 A | 2/2000 |
| JP | 2000-083067 A | 3/2000 |
| JP | 2000-099384 A | 4/2000 |
| JP | 2000-115167 B1 | 4/2000 |
| JP | 2000-122974 A | 4/2000 |
| JP | 2001-014254 A | 1/2001 |
| JP | 2001-027978 A | 1/2001 |
| JP | 2001-092702 A | 4/2001 |
| JP | 2001-155007 A | 6/2001 |
| JP | 2001-184289 A | 7/2001 |
| JP | 2001-306382 A | 11/2001 |
| JP | 2002-007182 | 1/2002 |
| JP | 2002-141952 A | 5/2002 |
| JP | 2002-149519 A | 5/2002 |
| JP | 2002-199150 A | 7/2002 |
| JP | 2002-217938 A | 8/2002 |

| | | |
|---|---|---|
| JP | 2002-217943 A | 8/2002 |
| JP | 2002-247036 A | 8/2002 |
| JP | 2002-269059 A | 9/2002 |
| JP | 2002-288415 A | 10/2002 |
| JP | 2002-342144 A | 11/2002 |
| JP | 2002-368826 A | 12/2002 |
| JP | 2003-006022 A | 1/2003 |
| JP | 2003-006032 A | 1/2003 |
| JP | 2003-032310 A | 1/2003 |
| JP | 2003-059792 A | 2/2003 |
| JP | 2003101565 A | 4/2003 |
| JP | 2003-162441 A | 6/2003 |
| JP | 2003-223521 A | 8/2003 |
| JP | 2003-258917 A | 9/2003 |
| JP | 2003-288247 A | 10/2003 |
| JP | 2004-013479 A | 1/2004 |
| JP | 2004-128597 A | 4/2004 |
| JP | 2004-133600 A | 4/2004 |
| JP | 2004-139291 A | 5/2004 |
| JP | 2004-201255 A | 7/2004 |
| JP | 2004-213533 A | 7/2004 |
| JP | 2004-215135 A | 7/2004 |
| JP | 2004-228817 A | 8/2004 |
| JP | 2004-265415 A | 9/2004 |
| JP | 2004-310371 A | 11/2004 |
| JP | 2004-328166 A | 11/2004 |
| JP | 2004-341849 A | 12/2004 |
| JP | 2004-362166 A | 12/2004 |
| JP | 2005-027040 A | 1/2005 |
| JP | 2005-038104 A | 2/2005 |
| JP | 2005-086520 A | 3/2005 |
| JP | 2005-115943 A | 4/2005 |
| JP | 2005-167608 A | 6/2005 |
| JP | 2005157699 A | 6/2005 |
| JP | 2005-210352 A | 8/2005 |
| JP | 2005-267658 A | 9/2005 |
| JP | 2005-276094 A | 10/2005 |
| JP | 2005-328239 A | 11/2005 |
| JP | 2006-013757 A | 1/2006 |
| JP | 2006-033105 A | 2/2006 |
| JP | 2006-050006 A | 2/2006 |
| JP | 2006-067045 A | 3/2006 |
| JP | 2006-172192 A | 6/2006 |
| JP | 2006-268138 A | 10/2006 |
| JP | 2006-343943 A | 12/2006 |
| JP | 2006337021 A | 12/2006 |
| JP | 2007-074035 A | 3/2007 |
| JP | 2007-086910 A | 4/2007 |
| JP | 2007-104440 A | 4/2007 |
| JP | 2006-033105 A | 8/2007 |
| JP | 2007-265135 A | 10/2007 |
| JP | 2007-310508 A | 11/2007 |
| JP | 2008-098699 A | 4/2008 |
| JP | 2008-098888 A | 4/2008 |
| JP | 2008-129991 A | 6/2008 |
| JP | 2008-148046 A | 6/2008 |
| JP | 2008-148125 A | 6/2008 |
| JP | 2008-148200 A | 6/2008 |
| JP | 2008-154101 A | 7/2008 |
| JP | 2008-306500 A | 12/2008 |
| JP | 2009-027652 A | 2/2009 |
| JP | 2009-031828 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |
| WO | 00-69140 A1 | 11/2000 |
| WO | 03-012578 A2 | 2/2003 |
| WO | 2006-028850 A2 | 3/2006 |
| WO | 2006/090465 A1 | 8/2006 |

OTHER PUBLICATIONS

Bato et al; "Proposal of Community-Based Information-Sharing Platform Using Distributed Servers", Proceedings of the 2007 IEICE General Conference, Mar. 20-23, 2007.
Cappiello et al; "Mobility Amongst Heterogeneous Networks with AAA Suport", Proceeding of IEEE International Conferences on Communications, Apr. 28-May 2, 2002, pp. 2064-2069.
Goode; "Voice Over Internet Protocol (VoIP)", Proceedings of the IEEE; vol. 90; No. 9; Sep. 2002; pp. 1495-1517.
Gurbani et al; "SIP: A Routing Protocol" Bell Labs Technical Journal, 2002, vol. 6; No. 2, pp. 136-152.
Ito; "NetworkWorld"; vol. 9, No. 12, pp. 146-151; Dec. 1, 2004.
Izumi; "Present TCP/IP and Full Gamut of Voip Technique", Interface ; CQ Publication Inc ,; Jun. 1, 2003; vol. 29, No. 6; pp. 66-78.
Jin et al; "Replica Based Distributed Metadata Mangement in Grid Enviroment", XP019033202; Coimputational Science-ICCS 2006 Lecture Notes In Computer Science; LNCS; http://www.springerlink.com/content/h2glt33m069677224/fulltext.pdf; vol. 3994; May 10, 2006; pp. 1055-1057.
Mac Fan Internet "An Old Timer of Character Chat IRC", Mac Fan Internet ; vol. 4, No. 6; p. 33; Jun. 1999.
Masuda "Multicast Network Control for Streaming Data Broadcasting", IEICE Technical Technical Report, vol. 100. No. 672; pp. 327-334; Mar. 9, 2001. Partial English translation.
Okumura SIP (Session Initiation Protocol), Nikkei Communications, Sep. 22, 2003, pp. 150-158 (partial translation pp. 155 and 156 (Usable in IM and Presence Notification)).
Pang. et al.; "Mobility and Session Mangement: UMTS VS. CDMA2000", IEEE Wireless Communicationa, Aug. 2004, pp. 30-43.
Roach et al.; "A Session Initiation Protocol (SIP) Event Notification Extension for Resource List"; Cisco Systems: Aug. 1, 2006; pp. 1-38.
Roach A. B.; "Session Initiation Protocol (SIP)- Specific Event Notification" Dynamicsoft; Jun. 1, 2002; pp. 1-38.
Rowstron et al. "Pastry Scalable, Decentralized Object Location, and Routing for Large- Scale Peer-to-Peer System", Middleware 2001, Nov. 12, 2001, vol. 2218, pp. 329-350.
Satyanarayanan "A Survey of Distributed File Systems" XP002260895: Technical Report CMU-CS-89-116; Feb. 1, 1989; 27 pages.
Thain et al."Separating Abstractions from Resources in a Tactical Storage System", XP010864894; Supercomputing, 2005; Proceeding of the ACM/IEEE SC 2005 Conferences; Nov. 12, 2005; 12 pages.
Traversat, Bernard et al. "Project JXTA 2.0 Super- Peer Virtual Network", XP-002481407; Sun Microsystems. Project JXTA; May 25, 2003; pp. 1-20.
USPTO Office Action dated Feb. 4, 2011, issued in U.S. Appl. No. 11/853,943.
USPTO Office Action dated Mar. 4, 2011, issued in U.S. Appl. No. 11/862,654.
USPTO Office Action dated Dec. 23, 2010, issued in U.S. Appl. No. 12/107,793.
USPTO Office Action dated Jan. 14, 2011, issued in corresponding U.S. Appl. No. 12/270,883.
USPTO Office Action dated Mar. 22, 2011, issued in corresponding U.S. Appl. No. 12/335,661.
USPTO Office Action dated Mar. 17, 2011, issued in U.S. Appl. No. 12/340,868.
Yasmazaki ; "P2P Network System" Japanese Society for Artificial Intelligence, vol. 16, No. 6, pp. 834-840, Nov. 2001.
Japanese Office Action dated Apr. 8, 2011, issued in corresponding Japanese Patent Application No. 2007-339311.
"Error & Warning Message Ways of Coping", Nikkei Personal Computing, No. 529, Nikkei Personal Computing, Japan, Nikkei BP, Nikkei Business Publications, Inc., May 10, 2007, p. 46.
Japanese Office Action dated Aug. 2, 2011, issued in corresponding Japanese Patent Application No. 2006-090693.
Japanese Office Action dated Aug. 2, 2011, issued in corresponding Japanese Patent Application No. 2006-335512.
Chinese Office Action dated Aug. 3, 2011, issued in corresponding Chinese Patent Application No. 200810096102.2.
Digital Advantage, NetBIOS name registration, [online], Aug. 16, 2002, [Search date: Nov. 16, 2009], Internet, <URL>: http://www.atmarkit.co.jp/fwin2k/network/baswinlan005/baswinlan005_02.html.
Japanese Office Action dated May 19, 2009, issued in corresponding Japanese Patent Application No. 2006-090690.
Japanese Office Action dated Nov. 24, 2009, issued in corresponding Japanese Patent Application No. 2006-090690.

Japanese Office Action dated Dec. 1, 2009, issued in corresponding Japanese Patent Application No. 2006-090691.
Shinji Okumura et al., SIP (session initiation protocol), Nikkei Communications, Sep. 22, 2003, pp. 150-158 (partial translation pp. 155-156 (Usable in IM and Presence Notification)).
U.S. Appl. No. 10/045,698, filed Jan. 10, 2002; inventor Y. Tanimoto.
U.S. Appl. No. 10/045,897, filed Jan. 10, 2002; inventor Y. Tanimoto.
U.S. Appl. No. 10/114,720, filed Apr. 1, 2002; inventor Y. Tanimoto.
U.S. Appl. No. 10/114,963, filed Apr. 2, 2002; inventor Y. Tanimoto.
U.S. Appl. No. 10/116,615, filed Apr. 2, 2002; inventor Y. Tanimoto.
U.S. Appl. No. 12/340,868, filed Dec. 22, 2008; inventor Y. Tanimoto.
U.S. Appl. No. 11/853,942, filed Sep. 12, 2007; inventor Y. Tanimoto.
U.S. Appl. No. 11/853,943, filed Sep. 12, 2007; inventor Y. Tanimoto.
U.S. Appl. No. 11/862,654, filed Sep. 27, 2007; inventor Y. Tanimoto.
U.S. Appl. No. 11/870,622, filed Oct. 11, 2007; inventor Y. Tanimoto.
U.S. Appl. No. 11/944,495, filed Nov. 23, 2007; inventor Y. Tanimoto.
U.S. Appl. No. 11/953,351, filed Dec. 10, 2007; inventor Y. Tanimoto.
U.S. Appl. No. 11/953,505, filed Dec. 10, 2007; inventor Y. Tanimoto.
U.S. Appl. No. 12/103,933, filed Apr. 16, 2008; inventor Y. Tanimoto.
U.S. Appl. No. 12/107,793, filed Apr. 23, 2008; inventor Y. Tanimoto.
U.S. Appl. No. 12/112,127, filed Apr. 30, 2008; inventor Y. Tanimoto.
U.S. Appl. No. 12/270,883, filed Nov. 14, 2008; inventor Y. Tanimoto.
U.S. Appl. No. 12/335,642, filed Dec. 16, 2008; inventor Y. Tanimoto.
U.S. Appl. No. 12/335,661, filed Dec. 16, 2008; inventor Y. Tanimoto.
Japanese Office Action dated Feb. 3, 2012, issued in related Japanese Patent Application No. 2009-205183.(w/machine translation).
Japanese Office Action dated Feb. 3, 2012, issued in related Japanese Patent Application No. 2009-205191.(w/machine translation).
Japanese Office Action dated Feb. 7, 2012, issued in related Japanese Patent Application No. 2009-201775.(w/machine translation).
United States Patent and Trademark Office Action dated Apr. 2, 2012, issued in U.S. Appl. No. 13/153,497.
U.S. Office Action dated Jul. 31, 2012, issued in related U.S. Appl. No. 11/870,622.
Office Action dated Jun. 26, 2012, in related Japanese Patent Application No. 2006-335539, with English-language machine translation (6 Pages).

* cited by examiner

FIG. 2

RELAY DEVICE DATABASE 351

| RELAY DEVICE NAME | URL | IP ADDRESS | STATUS |
|---|---|---|---|
| RELAY DEVICE A | Relayserver1@sample.net | 200.1.1.1 | LOGIN |
| RELAY DEVICE B | Relayserver2@sample.net | 200.2.2.2 | LOGIN |
| RELAY DEVICE C | Relayserver3@sample.net | 200.3.3.3 | LOGOUT |

FIG. 8

RELAY CONNECTION DATABASE 151

| CLIENT | RELAY DESTINATION URL | IP ADDRESS | CONNECTION NUMBER | GENERATED TIME |
|---|---|---|---|---|
| ClientX | Relayserver1@sample.net | 200.1.1.1 | 49583 | 08:00:15 |
| ClientY | Relayserver2@sample.net | 200.2.2.2 | 54682 | 08:32:42 |

FIG. 12

RELAY CONNECTION DATABASE 151

| CLIENT | RELAY DESTINATION URL | IP ADDRESS | CONNECTION NUMBER | GENERATED TIME |
|---|---|---|---|---|
| ClientX | Relayserver1@sample.net | 200.1.1.1 | 49583 | 08:00:15 |
| ClientY | | | | |
| ClientZ | Relayserver2@sample.net | 200.2.2.2 | 54682 | 08:32:42 |

RELAY DEVICE AND COMMUNICATION SYSTEM

CROSS REFERENCE TO RELATED APPLICATION

This application is a continuation application under 37 C.F.R. §1.53 (b) of U.S. application Ser. No. 11/723,466, filed Mar. 20, 2007, which is incorporated herein by reference.

BACKGROUND OF THE INVENTION

1. Field of the Invention

The present invention relates to technology for relaying data transmitted and received between communication devices.

2. Description of the Related Art

By using technology such as a Virtual Private Network (VPN) and tunneling, data transmitted from a terminal located inside a private network can be relayed to a terminal located in another private network via the Internet. For example, by establishing a connection between a Local Area Network (LAN) of a headquarter office and a LAN of a branch office via the VPN, data can be relayed between terminals connected to different LANs via the Internet.

According to known technology, data is relayed between local systems connected via the Internet. According to this technology, each terminal located within a local system accesses a relay server on the Internet to establish a Transmission Control Protocol (TCP) connection, and uses the established TCP connection to transmit and receive data between the local systems.

By using the technology of the VPN and the tunneling, data can be transmitted and received between different LANs connected via the Internet. However, such technology provides a system which is constructed by a fixed setting. That is, a relay device provided on the Internet between the LANs carries out a fixed connection setting between the LANs. Therefore, there is no problem when a VPN connection is preferably established constantly between a headquarter office and a branch office of a company, for example. However, the above-described technology cannot support a case in which a connection is to be established dynamically between different private networks.

The technology such as the VPN is basically technology for establishing a connection between networks, for example, between a LAN and a LAN, and is not technology for establishing a connection between individual terminals. Therefore, the technology such as the VPN is technology for enabling communication to be carried out between networks in which the VPN is developed as an infrastructure, and is not technology for supporting a case in which an individual personally demands a communication with a specific network.

Meanwhile, when constructing a system in which a connection is established between networks in response to a request from individual terminals, performance of a relay device may decrease due to a fact that resources may become insufficient when a plurality of connections are generated according to the request from terminals.

SUMMARY OF THE INVENTION

In order to overcome the problems described above, preferred embodiments of the present invention provide a system in which relaying of data between networks connected via the Internet can be set dynamically.

Preferred embodiments of the present invention also provide a system in which relaying of data between networks connected via the Internet can be set dynamically according to a request of each terminal.

According to an aspect of the present invention, a relay device can carry out communication with a first communication device, and includes a relay unit and a holding unit. The relay unit relays data received from the first communication device to another relay device. The holding unit inquires a status of the other relay device to a server device. When the other relay device is capable of accepting a connection, the holding unit carries out a connection request to the other relay device, dynamically establishes a relay connection with the other relay device, and holds the established relay connection. The other relay device can carry out communication with a second communication device. The relay device relays the data received from the first communication device to the other relay device to further relay the data to the second communication device.

The holding unit also establishes relay connections with a plurality of relay devices, and the relay unit uses the plurality of the relay connections to relay the data to the plurality of the relay devices.

The holding unit can separately disconnect the relay connections held with the plurality of the relay devices.

According to another aspect of the present invention, a communication system for relaying data between terminals includes a first relay device that can carry out communication with a first communication device, a server device, and a second relay device that can carryout communication with a second communication device. The first relay device includes a holding unit. When the holding unit inquires a status of the second relay device to the server device and the second relay device is capable of accepting a connection, the holding unit carries out a connection request to the second relay device, dynamically establishes a relay connection with the second relay device, and holds the established relay connection. The first relay device relays data received from the first communication device to the second relay device, and the second relay device further relays the data to the second communication device.

The first communication device and the second communication device are respectively provided in different private networks. Accordingly, a connection request for a TCP connection cannot be carried out to the first communication device and the second communication device from an external network.

According to another aspect of the present invention, a relay device can carry out communication with a first communication device. The relay device includes an accepting unit and a holding unit. The accepting unit accepts a relay transmission instruction designating another relay device from the first communication device. The holding unit inquires a status of the other relay device to the server device. When the other relay device is capable of accepting a connection, the holding unit carries out a connection request to the other relay device, dynamically establishes a relay connection with the other relay device, and holds the established relay connection. The other relay device can carry out communication with a second communication device. The relay device relays data received from the first communication device to the other relay device, and the other relay device further relays the data to the second communication device.

When the other relay device is incapable of accepting a connection, the holding unit notifies such a connection impossible state to the first communication device. When the holding unit receives a notification from the server device that the other relay device has become capable of accepting a connection, the holding unit notifies a connection possible state to the first communication device.

Only data, which has the first communication device as a transmitter or a transmission destination, is relayed over the relay connection held by the holding unit.

According to another aspect of the present invention, a communication system for relaying data between terminals includes a first relay device that can carry out communication with a first communication device, a server device, and a second relay device that can carry out communication with a second communication device. The first relay device includes an accepting unit and a holding unit. The accepting unit accepts a relay instruction of data designating the second relay device from the first communication device. The holding unit inquires a status of the second relay device to the server device. When the second relay device is capable of accepting a connection, the holding unit carries out a connection request to the second relay device, dynamically establishes a relay connection with the second relay device, and holds the established relay connection. The first relay device relays data received from the first communication device to the second relay device so that the second relay device can further relay the data to the second communication device.

The first communication device and the second communication device are respectively provided in different private networks. A connection request for a TCP connection cannot be carried out to the first communication device and the second communication device from an external network.

According to another aspect of the present invention a relay device can carry out communication with a first communication device. The relay device includes an accepting unit and a holding unit. The accepting unit accepts a relay transmission instruction designating another relay device from the first communication device. When a relay connection has not been established yet with the other relay device, the holding unit inquires a status of the other relay device to the server device. When the other relay device is capable of accepting a connection, the holding unit dynamically establishes a relay connection with the other relay device, and holds the established relay connection. When a relay connection is already established with the other relay device, the holding unit sets such relay connection to be shared with the first communication device. The other relay device can carry out communication with the second communication device. The relay device relays data received from the first communication device to the other relay device, and the other relay device further relays the data to the second communication device.

When receiving a notification from the first communication device to terminate the relay transmission to the other relay device, if the other communication device is carrying out a relay transmission to the other relay device, the relay connection established between the relay device and the other relay device is maintained. When none of the communication devices is carrying out a relay transmission to the other relay device, the holding unit disconnects the relay connection held with the other relay device.

According to another aspect of the present invention, a communication system for relaying data between terminals includes a first relay device that can carry out communication with a first communication device, a server device, and a second relay device that can carry out communication with the second communication device. The first relay device includes an accepting unit and a holding unit. The accepting unit accepts a relay transmission instruction of data designating the second relay device from the first communication device. When a relay connection is yet to be established with the second relay device, the holding unit inquires a status of the second relay device to the server device. When the second relay device is capable of accepting a connection, the holding unit dynamically establishes a relay connection with the second relay device and holds the established relay connection. When a relay connection is already established with the second relay device, the holding unit sets such relay connection to be shared with the first communication device. The first relay device relays data received from the first communication device to the second relay device, and the second relay device further relays the data to the second communication device.

The first communication device and the second communication device are respectively provided in different private networks. A connection request for a TCP connection cannot be carried out to the first communication device and the second communication device from an external network.

The relay device of the present invention inquires a status of another relay device to the server device. When the other relay device is capable of accepting a connection, the relay device carries out a connection request, and establishes and holds a relay connection with the other relay device. Therefore, a communication device, which can carry out communication with the relay device, can carry out communication via the private network with a communication device, which can carry out communication with the other relay device.

The relay device of the present invention can establish a relay connection with a plurality of relay devices, and hold the established relay connections. Therefore, when communication devices to which communication is to be carried out belong to different networks, a plurality of connections can be generated independently.

The relay device of the present invention can independently disconnect each of the relay connections being held with a plurality of the relay devices. Therefore, the relay device of the present invention can maintain only the connections that are necessary for communication, and resources can be utilized efficiently.

The relay device of the present invention accepts a relay transmission instruction designating the other relay device from the first communication device, and inquires a status of the other relay device to the server device. When the other relay device is capable of accepting a connection, the relay device dynamically establishes a relay connection with the other relay device and holds the established relay connection. Therefore, by carrying out a request designating a relay destination to the relay device of the present invention, a communication device, which can carry out communication with the relay device of the present invention, can carryout communication with a communication device, which can carry out communication with the other relay device. Since a connection is established between the relay devices according to a request from the communication device, a network of a communication destination can be selected and a connection can be established more dynamically.

When receiving a notification from the server device that the other relay device has become capable of accepting a connection, the relay device notifies a connection possible state to the first communication device. Accordingly, at a point of time when a preparation is completed at the relay destination, a relay transmission can be started immediately.

Only the data having the first communication device as a transmitter or a transmission destination is relayed over the relay connection held by the holding unit. Therefore, a terminal, which has carried out a connection request to the relay device, can exclusively use the established connection.

The relay device of the present invention accepts a relay transmission instruction designating another relay device from the first communication device. When a relay connection is already established between the relay device of the present invention and the other relay device, the relay device of the present invention sets the first communication device to share the already established relay connection. Therefore, by carrying out a request designating a relay destination to the relay device of the present invention, a communication device, which can carry out communication with the relay device of the present invention, can carryout communication with a communication device, which can carry out communication with the other relay device. When a relay connection is already established between the relay device of the present invention and the designated relay device, the already established relay connection is shared. Therefore, processing load for establishing a connection can be reduced, and resources can be saved.

When receiving a notification from the first communication device to terminate the relay transmission to the other relay device, if the other communication device is carrying out a relay transmission to the other relay device, the relay connection established with the other relay device is maintained. Accordingly, an end of communication of one communication device does not influence a communication of another communication device. A communication device sharing the relay connection can use the relay connection until the communication of the communication device itself is completed.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 2 illustrates a registration example of a relay device database.

FIG. 8 illustrates a registration example of a relay connection database.

FIG. 12 illustrates a registration example of a relay connection database.

DETAILED DESCRIPTION OF PREFERRED EMBODIMENTS

First Preferred Embodiment

Figure 1:
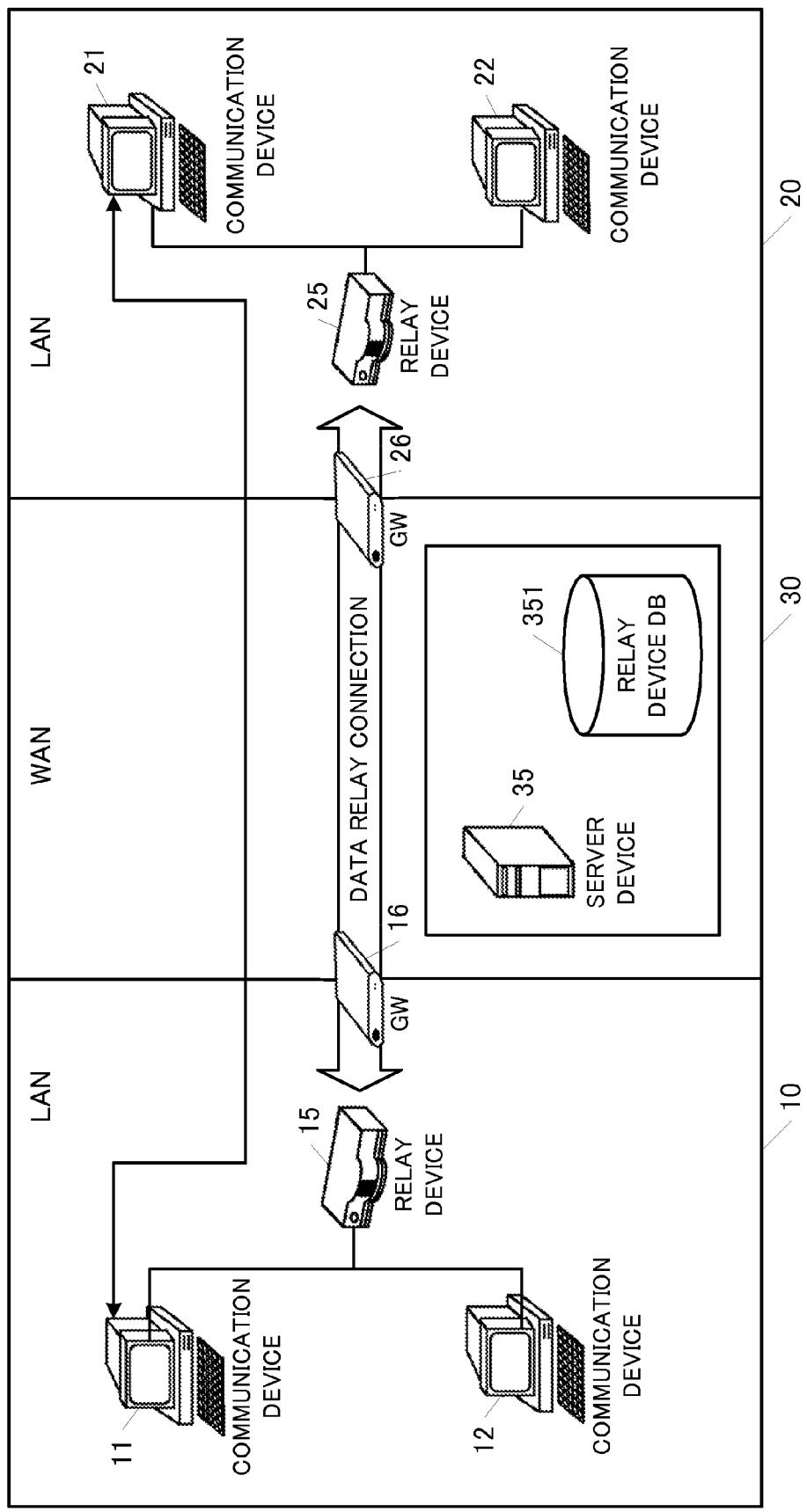
FIG. 1 illustrates a configuration of a communication system according to a first preferred embodiment of the present invention.

Preferred embodiments of the present invention will be described with reference to the accompanying drawings. FIG. 1 illustrates a configuration of a communication system according to a first preferred embodiment. In the communication system of the first preferred embodiment, two Local Area Networks (LANs) 10 and 20 are connected via a Wide Area Network (WAN) 30. For example, the LANs 10 and 20 are an in-house LAN of a company, and the WAN 30 is a public network such as the Internet. That is, two different private LANs 10 and 20 are connected via a public network such as the Internet.

As illustrated in FIG. 1, two communication devices 11 and 12 and a relay device 15 are connected in the LAN 10. The LAN 10 is connected to the WAN 30 via a gateway (GW) 16. Two communication devices 21 and 22 and a relay device 25 are connected in the LAN 20. The LAN 20 is connected to the WAN 30 via a gateway 26.

The communication devices 11 and 12 are terminals such as personal computers, and include a network function. Specifically, each of the communication devices 11 and 12 includes a Transmission Control Protocol/Internet Protocol (TCP/IP), and uses the TCP/IP to carry out communication with the relay device 15 and other computers or the like connected to the LAN 10. In the same manner, each of the communication devices 21 and 22 includes a TCP/IP, and uses the TCP/IP to carry out communication with the relay device 25 and other computers or the like connected to the LAN 20. The relay devices 15 and 25 and the gateways 16 and 26 can also carry out communication by the TCP/IP.

A server device 35 is connected to the WAN 30. As described above, the WAN 30 is a public network such as the Internet. Therefore, a terminal connected to the LAN 10, the LAN 20, or the WAN 30 can establish a TCP connection by designating a global IP address of the server device 35.

A private IP address is assigned to the communication devices 11 and 12 and the relay device 15 connected to the LAN 10 and the communication devices 21 and 22 and the relay device 25 connected to the LAN 20. The gateways 16 and 26 function as a firewall, and a connection cannot be established directly from an external network by designating a terminal located inside of the network. Therefore, a terminal or the like connected to the WAN 30 has restrictions when carrying out a TCP connection request to the relay device 15 or 25. In the first preferred embodiment, since the server device 35 functions as a Session Initiation Protocol (SIP) server (a proxy server and a registered server of the SIP) as to be described hereinafter, the gateways 16 and 26 are set such that communication designating a specific port corresponding to the relay servers 15 and 25 can be carried out to the gateways 16 and 26, respectively.

FIG. 2 illustrates a registration example of a relay device database 351 managed by the server device 35. In the example illustrated in FIG. 2, three relay devices A, B, and C are registered. The relay devices A, B, and C are device names that are assigned to the relay device 15 or the relay device 25, for example. Flags of a Uniform Resource Locator (URL), an IP address, and a login status are set for each of the relay devices A, B, and C.

An IP address of each of the relay devices registered in the relay device database 351 is not an IP address in a private network, but is a global IP address converted by a gateway by a function such as a Network Address Translation (NAT) or an IP masquerade. For example, the relay device 15 is assigned with a private address in the LAN 10. When the relay device 15 accesses the server device 35, the IP address assigned to the relay device 15 is converted into a global IP address by the gateway 16.

Each of the relay devices A through C establishes a connection with the server device 35, and logs into the server device 35. A "status" field of the relay device database 351 stores information indicating whether each of the relay devices A through C is currently under a logged-in status or a logged-out status with respect to the server device 35. When each of the relay devices is under a logged-in status, the server device 35 determines that a TCP connection is prepared to be established between the logged-in relay devices. In other words, a status in which the relay device is logged in the server device 35 indicates a status in which the relay device is capable of accepting a TCP connection request transmitted from another terminal.

Figure 3:
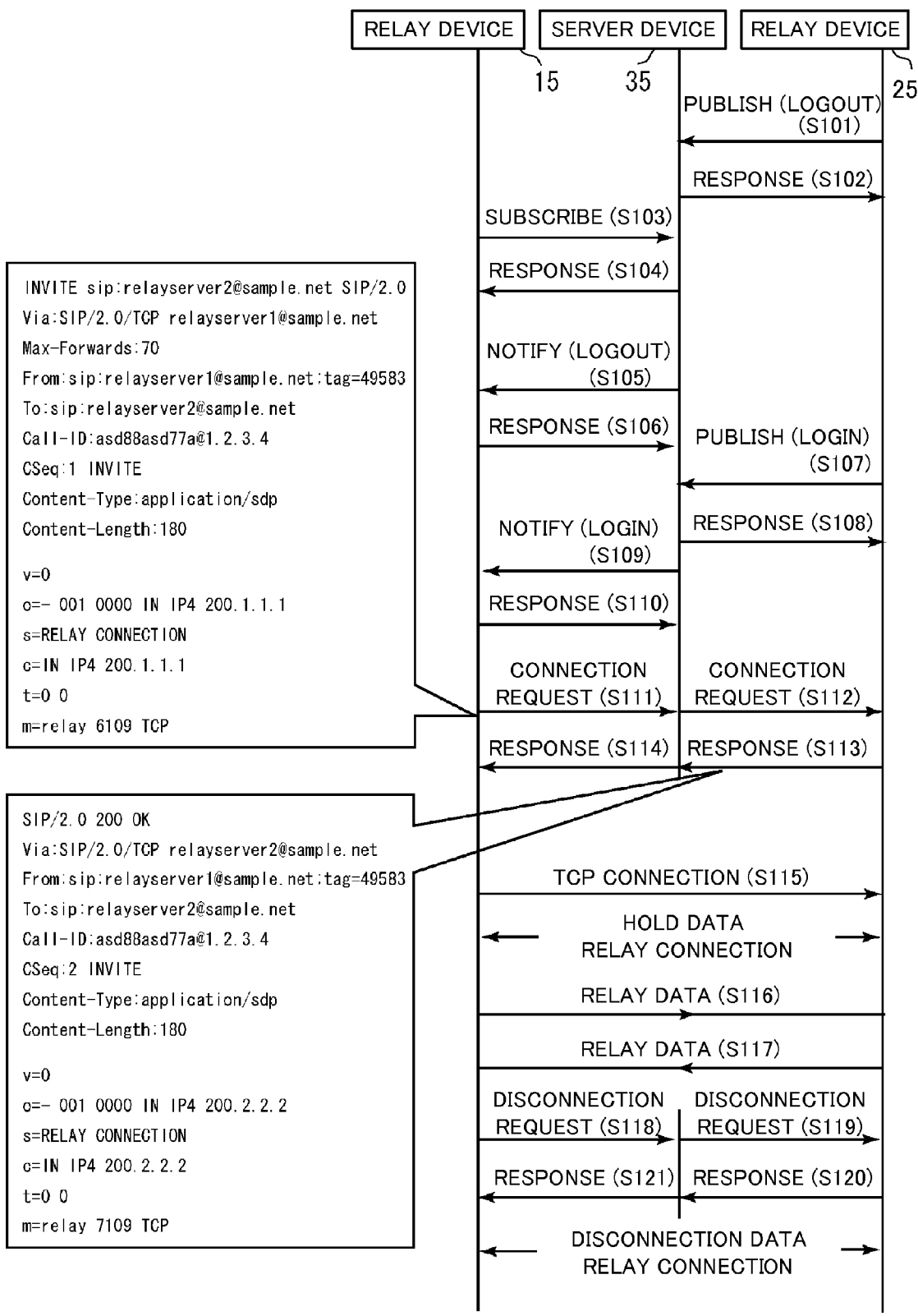
FIG. 3 is a flowchart illustrating a processing carried out in the communication system according to the first preferred embodiment of the present invention.
Figure 4:
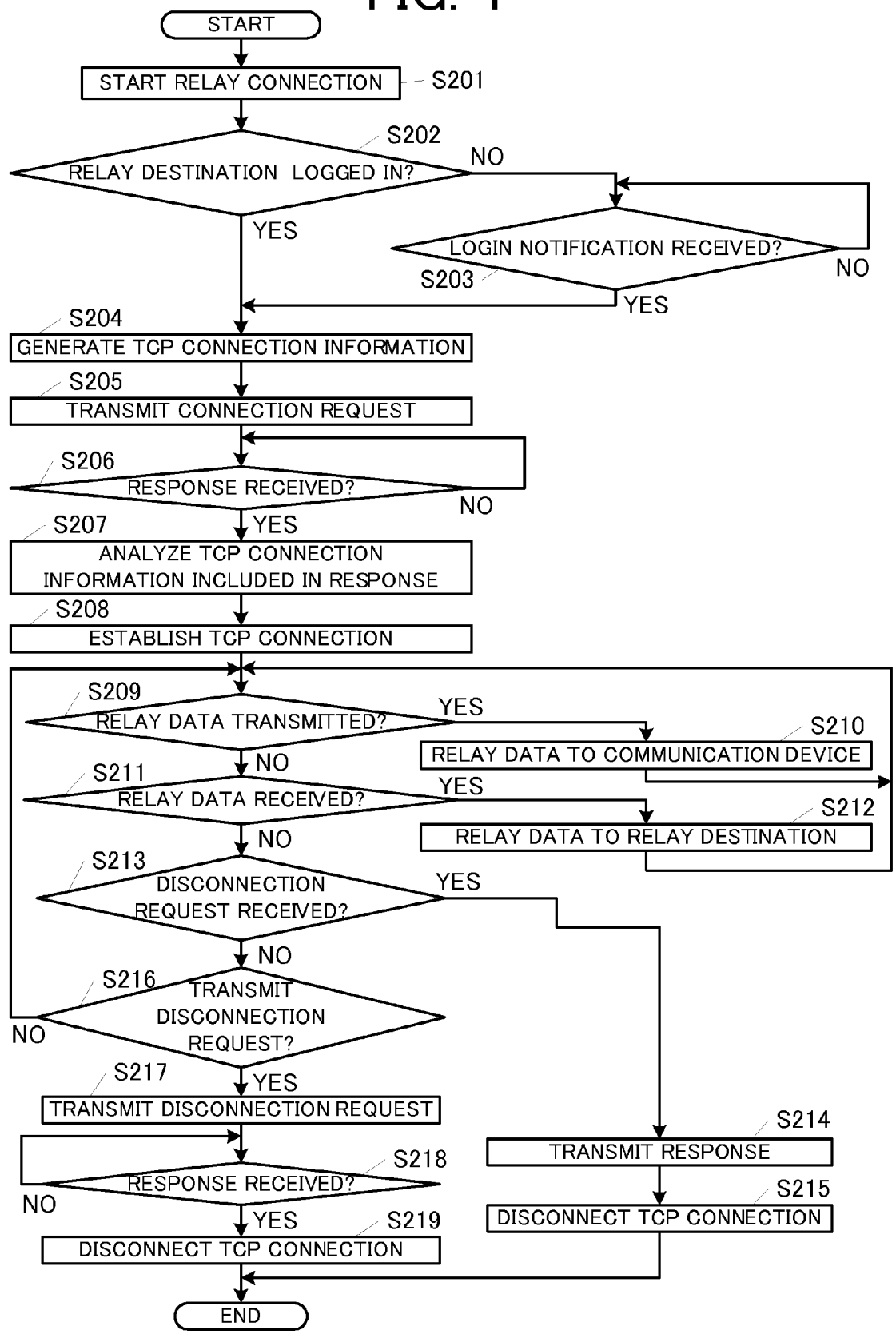
FIG. 4 is a flowchart illustrating a processing carried out in the communication system focusing on a relay device.
Figure 5:
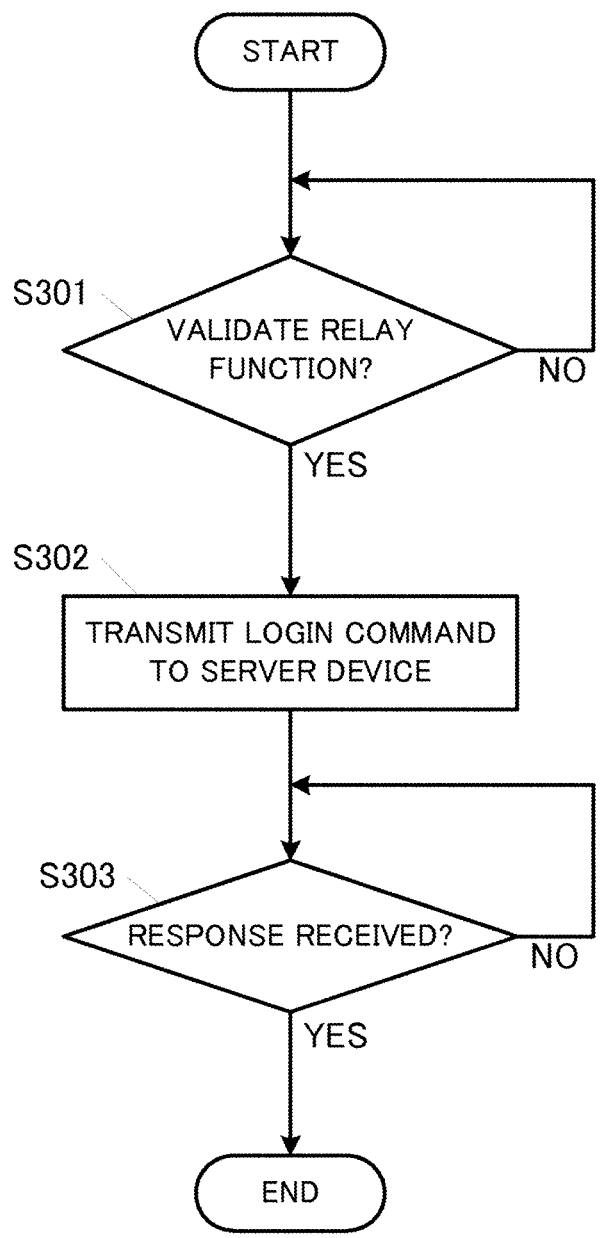
FIG. 5 is a flowchart illustrating a processing carried out in the communication system focusing on a relay device.

With reference to FIG. 3 through FIG. 5, a description will be made of a flow of a communication processing in the above-described communication system. FIG. 3 illustrates a flow of the processing of the entire communication system including the relay devices 15 and 25 and the server device 35. Further, in the following description, a Session Initiation Protocol (SIP) is used for communication between the relay device 15 and the server device 35, and between the relay device 25 and the server device 35. However, other protocols may also be used.

Each of the relay devices 15 and 25 transmits a "REGISTER request message" of the SIP to the server device 35 at initialization or periodically to notify position information (for example, an IP address, and/or a port number) of the relay device to the server device 35. The server device 35 manages the relay device database 351 illustrated in FIG. 2 according to the notified position information. The server device 35 can carry out communication with each of the relay devices over the gateway according to the position information. In FIG. 3, under an initial state, the relay device 15 and the relay device 25 are logged in the server device 35. First, the relay device 25 notifies logout status information to the server device 35 (step S101), and the server device 35 responds to the notification (step S102). The server device 35 executes a logout processing of the relay device 25, and updates the "status" field of the relay device 25 in the relay device database 351 to "logout".

Under this state, when the relay device 15 carries out a notification request of the status information to the server device 35 (step S103), the server device 35 carries out a response (step S104), and notifies that the relay device 25 is logged-out (step S105). The relay device 15 responds to this notification (step S106).

Next, the relay device 25 notifies login status information to the server device 35 (step S107), and the server device 35 responds to the notification (step S108). The server device 35 executes the login processing of the relay device 25, and updates the "status" field of the relay device database 351 to "login". Furthermore, the server device 35 notifies the relay device 15 that the relay device 25 has logged in (step S109). The relay device 15 responds to this notification (step S110).

When the relay device 15 receives a notification that the relay device 25 has logged in, the relay device 15 transmits a connection request for the relay device 25 to the server device 35 (step S111). As illustrated in FIG. 3, this connection request is an "INVITE request message" of the SIP, and includes TCP connection information in a body portion following a blank line. In the illustrated example, the connection request includes an IP address (200.1.1.1) and a TCP port number (6109) or the like of the relay device 15 (transmitter). The server device 35 relays the connection request to the relay device 25 (step S112). The relay device 25, which has received the connection request, transmits a response to the server device 35 to permit a connection (step S113). As illustrated in FIG. 3, this response is "200 OK response message" of the SIP, and includes TCP connection information in a body portion following a blank line. In the illustrated example, the response includes an IP address (200.2.2.2) and a TCP port number (7109) or the like of the relay device 25 (transmitter). The server device 35 relays the response to the relay device 15 (step S114). As described above, the relay device 15 and the relay device 25 use the INVITE request and the OK response of the SIP to exchange TCP connection information, and carry out a negotiation for establishing a TCP connection. When the relay device 15 receives the response, the relay device 15 transmits a TCP connection request to the relay device 25 (step S115). Accordingly, a TCP connection is established between the relay device 15 and the relay device 25.

The above-described processing is executed by a network administrator of the LAN 10 or the LAN 20, for example. That is, in order to prepare such that a connection with another LAN can be carried out dynamically, a relay device in a network is logged into the server device 35 by the network administrator as illustrated at step S107. Accordingly, a preparation is completed for receiving a TCP connection request from another relay device. When the network administrator wishes to carry out a connection with another LAN, the network administrator accesses the server device 35, and acquires status of a destination relay device. When the network administrator learns that the destination relay device is under a logged-in status, the network administrator transmits a connection request to the server device 35.

That is, in the present preferred embodiment, the relay device 15 transmits an INVITE request of the SIP via the server device 35 to establish a TCP connection (media session) for relaying. In other words, since a relay channel as a media session is generated by a call control protocol, a relay communication channel can be established dynamically.

When a TCP connection is established between the relay device 15 and the relay device 25 as described above, the relay device 15 and the relay device 25 hold the established TCP connection. When the relay device 15 receives data from the communication device 11, 12 or the like to be transmitted to the communication device 21, 22 or the like, the relay device 15 relays the received data to the relay device 25 (step S116). The relay device 25 further relays the relayed data to the communication device 21, 22 or the like. Data transmitted from the communication device 21, 22 or the like is also relayed to the communication device 11, 12, or the like via the relay device 25 and the relay device 15 (step S117).

Further, in order to carry out communication between the LAN 10 and the LAN 20 via the WAN 30, each of the relay devices 15 and 25 manages a list of device names of communication devices connected to each of the LANs 10 and 20, respectively. When a TCP connection is established between the relay device 15 and the relay device 25, the relay device 15 and the relay device 25 exchange the list. When carrying out communication between a communication device connected to the LAN 10 and a communication device connected to the LAN 20, a device name of a relay device of a LAN of a transmission destination and a device name of a communication device of the transmission destination are designated. That is, since a unique device name (registered in the relay device database 351) is assigned to a relay device using such a communication system, by designating both the device name of the relay device and the device name of the communication device, the communication device of the transmission destination can be identified uniquely. For example, a name such as "communication device name@relay device name" may be used. Each relay device knows an association between a communication device name and an IP address for a communication device connected to the LAN to which the relay device itself is also connected. Therefore, the relay device can relay data to a communication device designated by "communication device name@relay device name".

When transmission and reception of data between the communication devices end and the connection established between the relay device 15 and the relay device 25 becomes unnecessary, the network administrator disconnects the connection. First, the relay device 15 transmits a disconnection request for the relay device 25 to the server device 35 (step S118). The server device 35 relays the disconnection request to the relay device 25 (step S119). A response from the relay device 25 is transmitted to the server device 35 (step S120), and relayed to the relay device 15 (step S121).

FIG. 4 is a flowchart focusing on a processing carried out by the relay device 15 in the processing described with reference to FIG. 3. First, the relay device 15 transmits a starting request for starting a relay connection to the server device 35 (step S201). The relay device 25 is designated as the relay destination in the starting request. When a fact that the relay device 25 of the relay destination is logged out becomes apparent from the response from the server device 35 (step S202: NO), the relay device 15 stands by until receiving a login notification (step S203). When receiving a login notification (step S203: YES), the process proceeds onto step S204.

When a determination is made at step S202 that the relay device 25 of the relay destination is logged in, the relay device 15 generates TCP connection information (step S204), and transmits a connection request (step S205). Then, the relay device 15 stands by for a response from the relay device 25 (step S206). When receiving a response (step S206: YES), the relay device 15 analyzes the TCP connection information included in the received response (step S207). That is, the relay device 15 acquires port number information or the like included in the response transmitted from the relay device 25. Then, the relay device 15 carries out a TCP connection with the relay device 25 (step S208).

Under a state in which a TCP connection is established and held, when the communication device 11 or the like transmits relay data (step S209: YES), the relay device 15 relays the data to the communication device 21 or the like (step S210). When the relay device 15 receives relay data to be relayed to the communication device 11 or the like (step S211: YES), the relay device 15 relays the data to the communication device 11 or the like of the relay destination (step S212). When the relay device 15 receives a disconnection request from the relay device 25 (step S213: YES), the relay device 15 transmits a response (step S214) and disconnects the TCP connection (step S215).

When a disconnection request is carried out by a network administrator of the LAN 10 (step S216: YES), the relay device 15 transmits a disconnection request to the relay device 25 (step S217). When the relay device 15 receives a response (step S218: YES), the relay device 15 disconnects the TCP connection (step S219).

FIG. 5 is a flowchart focusing on a processing carried out by the relay device 25 in the processing described with reference to FIG. 3. First, a network administrator of the LAN 20 determines whether or not to prepare for establishing a connection with another LAN. When preparing for establishing a connection with another LAN, an operation is performed for validating a relay function of the relay device 25. When the relay function is validated (step S301: YES), the relay device 25 transmits a login command to the server device 35 (step S302). Then, the relay device 25 receives a response from the server device 35 (step S303), and a processing for validating the relay function is completed.

As described above, when the relay device 25 of the relay destination is under a logged-in status, that is, when the relay device 25 is capable of accepting a connection, the relay device 15 dynamically establishes a TCP connection with the relay device 25. Accordingly, data can be transmitted and received via the WAN 30 such as the Internet. For example, in case of a headquarter office and a branch office of a company where traffic constantly generates stably, LANs may be connected fixedly by using the conventionally used VPN. Meanwhile, when carrying out data communication by establishing connections with different networks via the WAN 30 under any timing, the communication system of the present preferred embodiment can be used.

According to the communication system of the present preferred embodiment, when a connection environment (an IP address and/or a port number) of the relay device of the other party is changed, the relay device carries out a negotiation first (steps S111 through S114). Therefore, a connection for relaying data can be established reliably.

Figure 6:
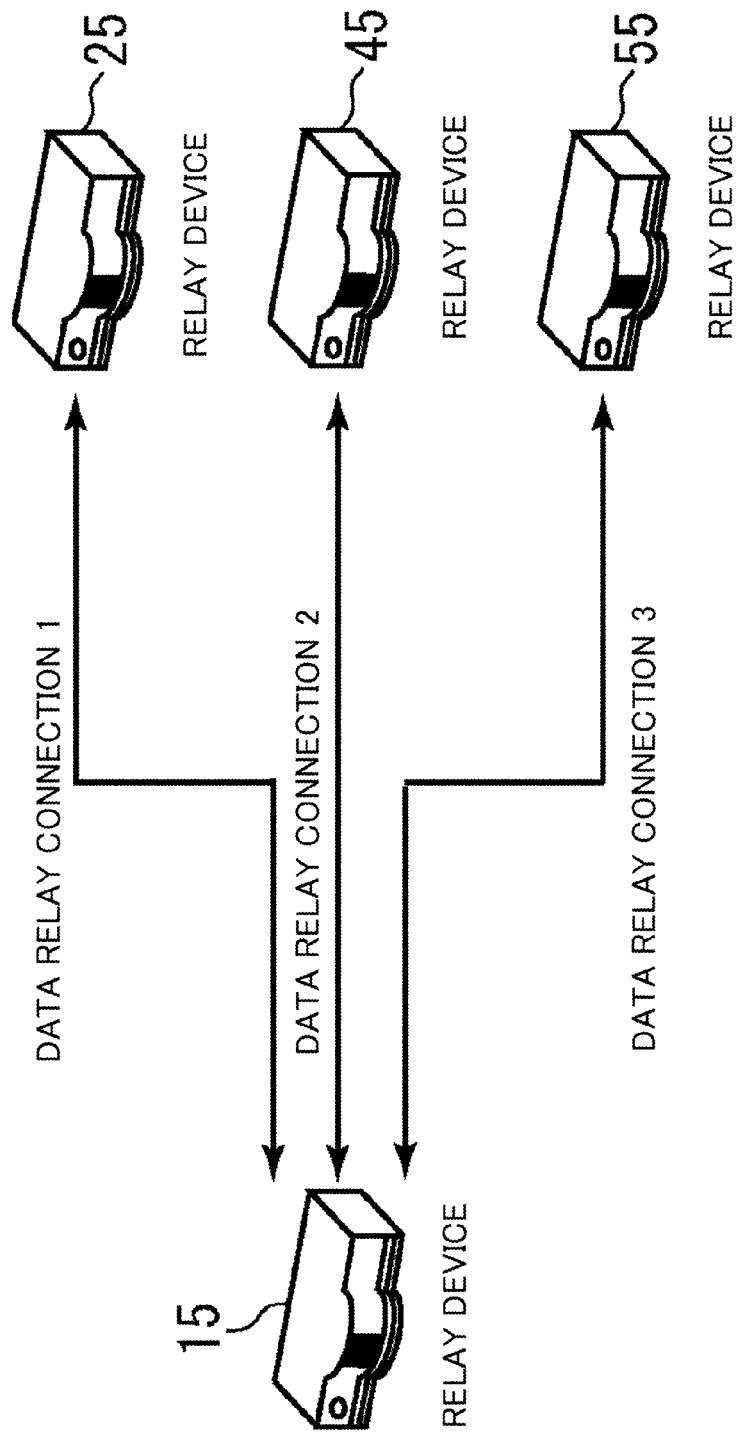
FIG. 6 illustrates an imaginary state in which a plurality of relay connections are established.

The relay devices 15 and 25 of the present preferred embodiment can establish a TCP connection with a plurality of relay devices. For example, as illustrated in FIG. 6, the relay device 15 can establish a separate TCP connection with each of three relay devices 25, 45 and 55. A method for establishing a TCP connection with the relay devices 45 and 55 is the same as the processing carried out with respect to the relay device 25. Each of the relay devices 15 and 25 or the like establishes a TCP connection with a plurality of relay devices, and relays data to the plurality of the relay devices. In an example illustrated in FIG. 6, the relay device 15 relays data transmitted from a certain communication device to the relay device 45, and relays data transmitted from another communication device to the relay device 55.

A method for disconnecting the TCP connection established with each of the relay devices 45 and 55 is also the same as the processing carried out with respect to the relay device 25. That is, a TCP connection can be established independently with each of the plurality of the relay devices 25, 45, and 55, and the TCP connection can be disconnected independently.

Conventionally, in the VPN or the like, when a plurality of LANs are connected, the plurality of the LANs are connected as one VPN. Meanwhile, according to the communication system of the present preferred embodiment, a connection is established independently with just a relay device to which a communication is to be carried out, and a connection established with a relay device to which a communication is no longer necessary to be carried out can be disconnected independently. Therefore, efficient communication system can be constituted without consuming unnecessary resources.

Second Preferred Embodiment

Next, a second preferred embodiment of the present invention will be described. In the first preferred embodiment, a connection is established dynamically between relay devices according to an instruction from a network administrator. In the second preferred embodiment, a connection is established between relay devices according to a designation from a communication device. Specifically, in the first preferred embodiment, by predicting a status of communication to be generated between the communication devices, a network administrator carries out an operation for establishing or disconnecting a connection between the relay devices. Meanwhile, in the second preferred embodiment, a control is carried out to establish or disconnect a connection between the relay devices more dynamically according to a communication processing that generates from a communication device. In the following description, a description that is the same as the first preferred embodiment will be omitted.

Figure 7:
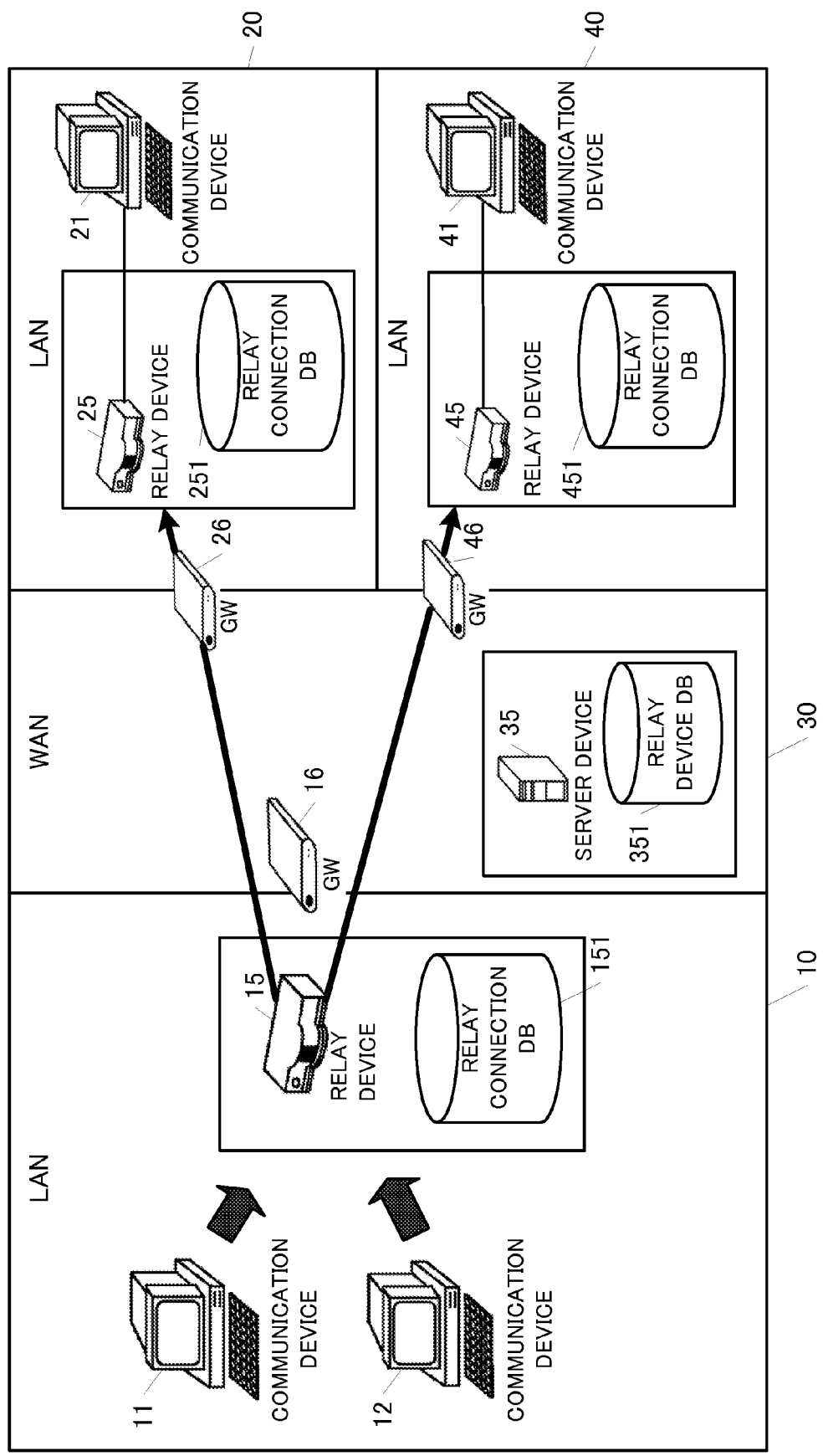
FIG. 7 illustrates a configuration of a communication system according to a second preferred embodiment of the present invention.

FIG. 7 illustrates an example of a configuration of a communication system according to the second preferred embodiment of the present invention. In FIG. 7, a LAN 40 is added to the system configuration illustrated in FIG. 1. The basic system configuration illustrated in FIG. 7 is the same as the first preferred embodiment. A communication device 41 and a relay device 45 are connected to the LAN 40, and the LAN 40 is connected to a WAN 30 via a gateway 46.

The relay devices 15, 25, and 45 include relay connection databases 151, 251, and 451, respectively. FIG. 8 illustrates an example of registration of the relay connection database 151 stored in the relay device 15.

The relay connection database 151 is a database for managing a TCP connection currently established by the relay device 15. A "client" field stores a setting of a device name of a communication device that has requested a connection to be established with a relay device (hereinafter referred to as a "requesting communication device"). For example, "ClientX" and "ClientY" in FIG. 8 are a device name assigned to the communication device 11, 21 or the like. "Relay destination URL" and "IP address" fields store a setting of a URL and an IP address of a relay device of a relay destination, respectively. "Connection number" field stores a setting of a port number of a generated TCP connection. "Generated time" field stores a setting of time when a TCP connection has been established.

In the present preferred embodiment, according to a designation from the requesting communication device, a TCP connection is established with a relay device of a communication destination. However, a device that can use such a TCP connection for carrying out communication is only the requesting communication device. That is, as illustrated in FIG. 8, one-to-one relation is established for a communication device and a TCP connection.

The contents of the relay connection databases 251 and 451 are the same as the relay connection databases 151 illustrated in FIG. 8. The relay connection databases 251 and 451 include registration of a status of a TCP connection currently established by the relay devices 25 and 45, respectively.

Figure 9:
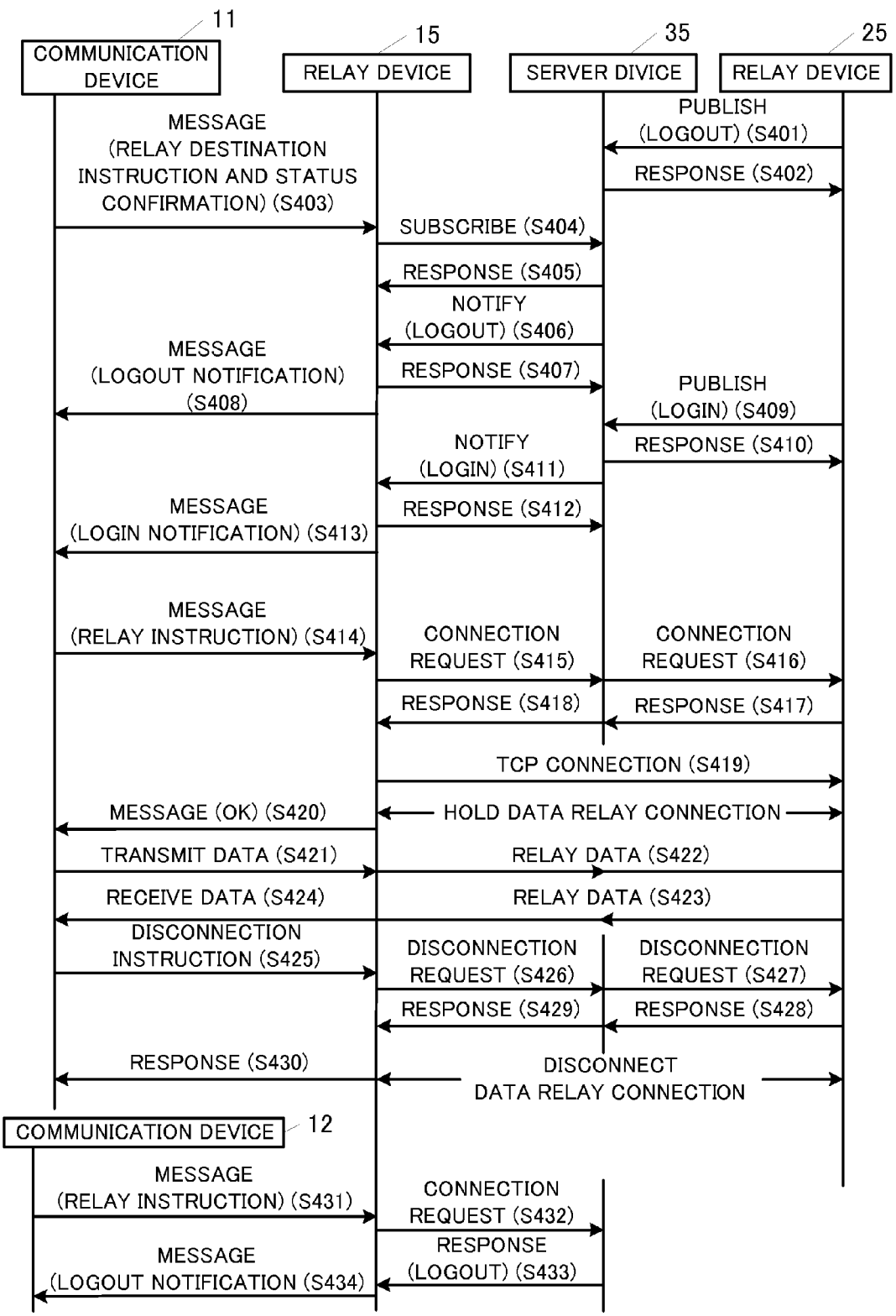
FIG. 9 is a flowchart illustrating a processing carried out in the communication system according to the second preferred embodiment of the present invention.

Next, with reference to FIG. 9 through FIG. 11, a description will be made of a flow of a communication processing carried out in the above-described communication system. FIG. 9 illustrates a flow of the processing of the entire communication system including the communication devices 11 and 12, the relay devices 15 and 25, and the server device 35. Further, in the following description, a description will be made of an example in which the SIP is used for the communication between the relay devices 15 and the server device 35 and between the server device 35 and the relay device 25. However, other protocols may also be used.

In the same manner as in the first preferred embodiment, each of the relay devices 15 and 25 transmits a "REGISTER request message" of the SIP to the server device 35 at initialization or periodically to notify position information (for example, an IP address and/or a port number) of the relay device to the server device 35. In FIG. 9, under an initial state, the relay device 15 and the relay device 25 are logged in the server device 35. First, the relay device 25 notifies logout status information to the server device 35 (step S401), and the server device 35 responds to the notified logout status information (step S402). The server device 35 executes a logout processing of the relay device 25, and updates the "status" field of the relay device 25 in the relay device database 351 to "logout".

Under this state, the communication device 11 transmits a relay transmission request of data and a status confirmation request, which designate the relay device 25, to the relay device 15 (step S403). When the relay device 15 carries out a notification request of the status information to the server device 35 (step S404), the server device 35 carries out a response (step S405) and notifies the relay device 15 that the relay device 25 is logged out (step S406). The relay device 15 responds to the notification (step S407). Furthermore, the relay device 15 notifies the communication device 11 that the relay device 25 is a logged out (step S408). Accordingly, the communication device 11 stands by until the relay device 25 logs in.

Next, the relay device 25 notifies login status information to the server device 35 (step S409), and the server device 35 responds to the notified login status information (step S410). The server device 35 executes a login processing of the relay device 25, and updates the "status" field of the relay device database 351 to "login". The server device 35 also notifies the relay device 15 that the relay device 25 has logged in (step S411). The relay device 15 responds to the notification (step S412). Furthermore, the relay device 15 notifies the communication device 11 that the relay device 25 has logged in (step S413).

When the communication device 11, which has been on standby, receives the notification carried out at step S413, the communication device 11 carries out a relay transmission request again designating the relay device 25 (step S414). Further, in the second preferred embodiment, the communication device 11 is provided to standby until receiving a notification that the relay device 25 has logged in. However, as another preferred embodiment, without standing by for such a notification, the communication device 11 may periodically transmit a relay transmission request to the relay device 15.

When the relay device 15 receives the relay transmission request from the communication device 11, the relay device 15 transmits a connection request for the relay device 25 to the server device 35 (step S415). As described in the first preferred embodiment, the connection request is an "INVITE request message" of the SIP, and includes TCP connection information. The server device 35 relays the connection request to the relay device 25 (step S416). When receiving the connection request, the relay device 25 transmits a response to the server device 25 to permit a connection (step S417). As described in the first preferred embodiment, the response is "200 OK response message" of the SIP, and includes TCP connection information. The server device 35 relays the response to the relay device 15 (step S418). The relay device 15 and the relay device 25 exchange the TCP connection information as described above. When receiving the response, the relay device 15 transmits a TCP connection request to the relay device 25 (step S419). Accordingly, a TCP connection is established between the relay device 15 and the relay device 25.

The above-described processing is carried out dynamically, for example, when a communication processing from the communication device 11 to the communication device 21 generates. That is, the relay devices are not connected fixedly, but a connection is carried out when traffic generates. However, in order to prepare for a connection request from a relay device of another end, a network administrator is required to be prepared by logging a relay device within a network into the server device 35 as illustrated at step S409.

In the present preferred embodiment, the relay device 15 receives an instruction from the communication device 11, and the relay device 15 transmits an INVITE request of the SIP via the server device 35 to establish a relay TCP connection (media session). That is, at a point of time when a connection request from a communication device generates, since a relay channel as a media session is generated by a call control protocol, a relay communication channel can be established dynamically.

When a TCP connection is established between the relay device 15 and the relay device 25 as described above, the relay device 15 and the relay device 25 hold the established TCP connection. When the communication device 11 transmits data addressed to the communication device 21, 22 or the like (step S421), the relay device 15 relays the data to the relay device 25 (step S422). The relay device 25 further relays the relayed data to the communication device 21, 22 or the like. The data transmitted from the communication device 21, 22 or the like is relayed to the relay device 15 via the relay device 25 in the same manner (step S423) and relayed further to the communication device 11 via the relay device 15 (step S424).

When a relay transmission using the relay device 25 is completed, the communication device 11 transmits a disconnection instruction to the relay device 15 (step S425). The relay device 15 transmits a disconnection request for the relay device 25 to the server device 35 (step S426). The server device 35 relays the received disconnection request to the relay device 25 (step S427). A response from the relay device 25 is transmitted to the server device 35 (step S428) and relayed to the relay device 15 (step S429). Accordingly, the TCP connection between the relay device 15 and the relay device 25 is disconnected, and the relay device 15 notifies the communication device 11 that the TCP connection has been disconnected (step S430).

Under such a state, when another communication device 12 carries out a relay transmission request designating the relay device 25 again (step S431), a connection request is transmitted from the relay device 15 to the server device 35 (step S432). At this point of time, when the relay device 25 is under a logged-out status, the server device 35 notifies the logged-out status (step S433), and the communication device 12 is notified that the relay device 25 is under a logged-out status. In the same manner as the processing carried out by the communication device 11, when the relay device 25 logs in, the communication device 12 carries out a relay transmission request to the relay device 25 again. Accordingly, a TCP connection is established between the relay device 15 and the relay device 25.

Figure 10:
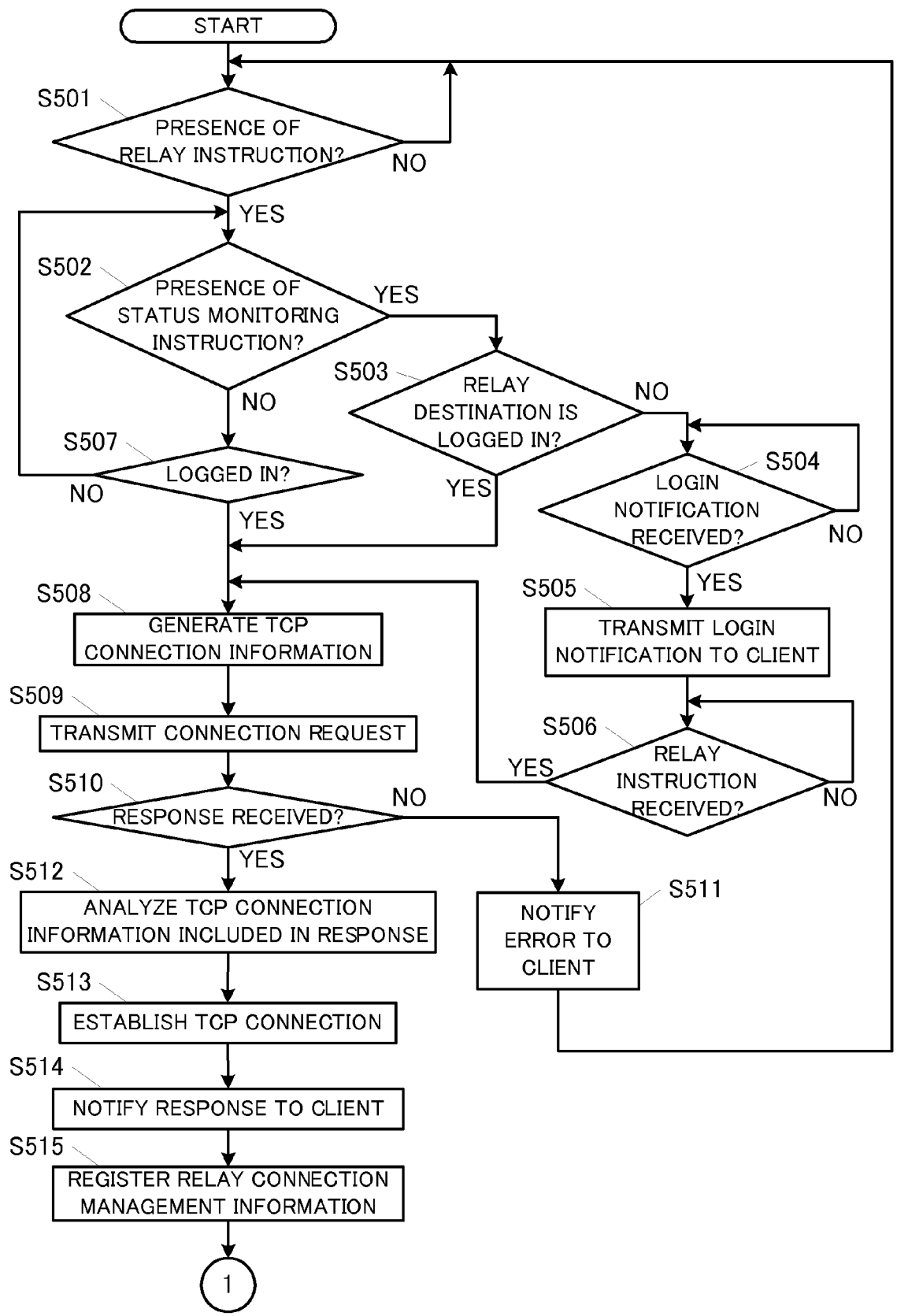
FIG. 10 is a flowchart illustrating a processing carried out in the communication system focusing on a relay device.

FIG. 10 is a flowchart focusing on a processing carried out by the relay device 15 in the processing described with reference to FIG. 9. First, the relay device 15 confirms whether or not a relay instruction from the communication device 11, 12 or the like is generated (step S501). When a relay instruction is generated (step S501: YES), the relay device 15 confirms whether or not a status monitoring instruction is generated (step S502). When the status monitoring instruction is generated, the relay device 15 checks whether or not the relay device of the relay destination is logged in (step S503). When the relay device 15 confirms that the relay device of the relay destination is logged out (step S503: NO), the relay device 15 stands by until receiving a login notification (step S504).

When receiving a notification from the server device 35 indicating that the relay device of the relay destination has logged in (step S504: YES), the relay device 15 notifies the requesting communication device that the relay destination has logged in (step S505). Then, the relay device 15 stands by until receiving a relay instruction from the communication device 11, 12 or the like again (step S506). When the relay device 15 receives a relay instruction, the process proceeds onto step S508. When a determination is made at step S503 that the relay device of the relay destination is logged in, the process proceeds immediately onto step S508. When a status monitoring instruction is not included in the request from the communication device (step S502: NO), if the relay destination is logged in (step S507: YES), the process proceeds onto step S508. If the relay destination is not logged in, the process returns to step S502 and the processing is repeated. That is, when a status monitoring instruction has been received from a requesting communication device, the relay device 15 monitors the relay device of the relay destination until the relay device of the relay destination logs in. When receiving a notification that the relay device of the relay destination has logged in, the relay device 15 notifies such information also to the requesting communication device.

Next, the relay device 15 generates TCP connection information (step S508) and transmits a connection request (step S509). The relay device 15 stands by until receiving a response from the relay device 25 (step S510). When not receiving a response (step S510: NO), the relay device 15 carries out an error notification to the requesting communication device (step S511). The process returns to step S501 and the processing is repeated. When receiving a response (step S510: YES), the relay device 15 analyzes the TCP connection information included in the received response (step S512). That is, the relay device 15 acquires port number information or the like included in the response transmitted from the relay device 25. Then, the relay device 15 carries out a TCP connection to the relay device 25 (step S513). The relay device 15 notifies the requesting communication device that a connection has been established with the relay destination (step S514). Then, the relay device 15 registers information of the newly established TCP connection in the relay connection database 151 (step S515).

Figure 11:
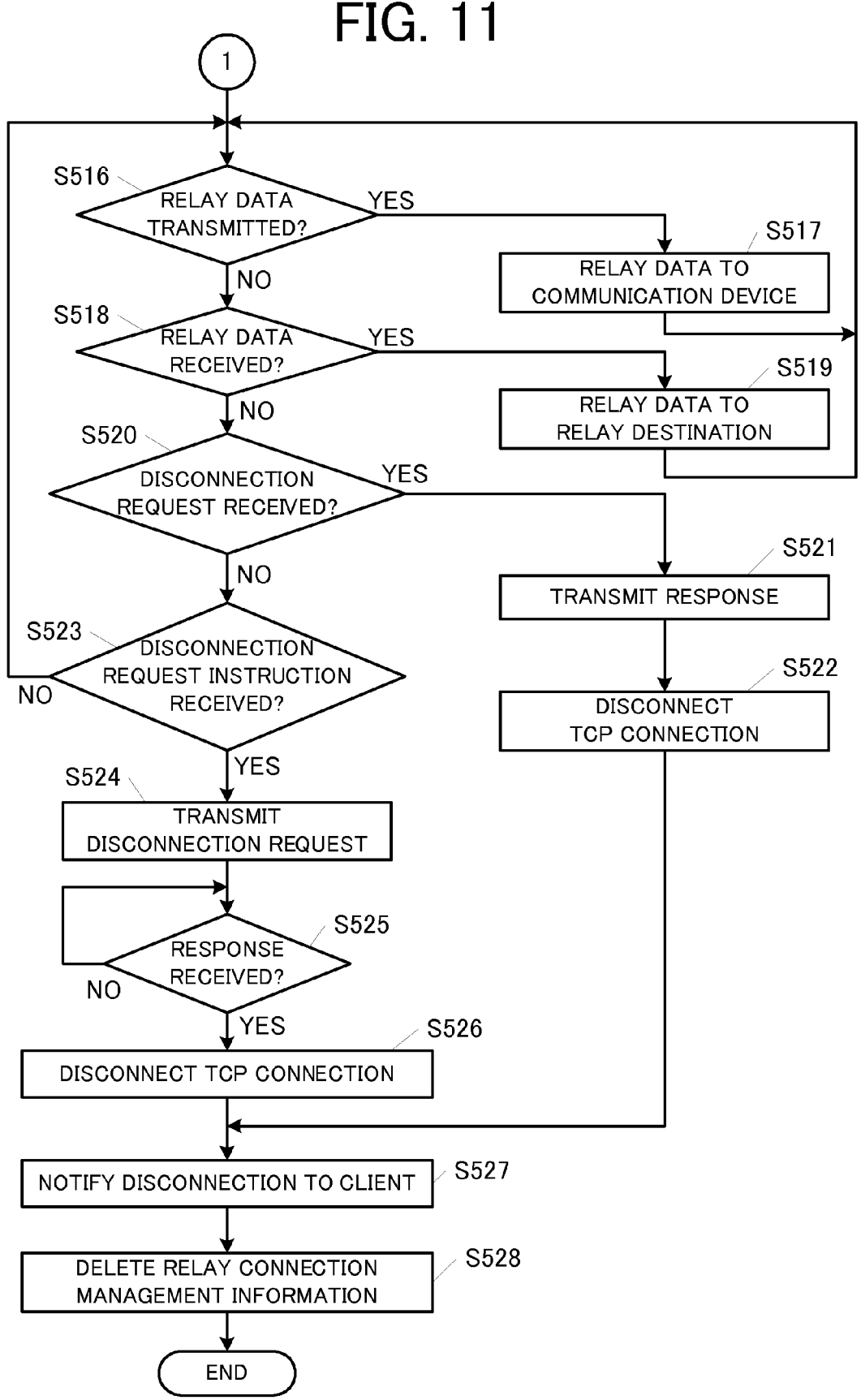
FIG. 11 is a flowchart illustrating a processing carried out in the communication system focusing on a relay device.

Under a state in which the TCP connection is established and held, in the flowchart of FIG. 11, when relay data is transmitted from the communication device 11 or the like (step S516: YES), the relay device 15 relays the data to the communication device 21 or the like (step S517). When receiving relay data to be relayed to the communication device 11 or the like (step S518: YES), the relay device 15 relays the data to the communication device 11 or the like of the relay destination (step S519). When receiving a disconnection request from the relay device 25 (step S520: YES), the relay device 15 transmits a response (step S521) and disconnects the TCP connection (step S522). When a disconnection request is carried out by the requesting communication device (step S523: YES), the relay device 15 transmits a disconnection request to the relay device 25 of the relay destination (step S524). When receiving a response (step S525: YES), the relay device 15 disconnects the TCP connection (step S526). Then, the relay device 15 notifies the requesting communication device that a connection with the relay destination has been disconnected (step S527), and the information of the TCP connection registered in the relay connection database 151 is deleted (step S528).

As described above, according to the second preferred embodiment, when a relay instruction from a communication device generates, a TCP connection is established dynamically with the relay device of the relay destination, and communication can be carried out between private networks. Unlike the conventional VPN or the like that is fixedly set, when a request of communication generates, a connection necessary for such communication is established. Therefore, resources can be utilized efficiently.

According to the second preferred embodiment, when a communication connection is established according to a request from a certain communication device, only such a requesting communication device is permitted to use the established communication connection. For example, when a request of communication generates from the communication device 11 to the communication device 21, a TCP connection is established between the relay device 15 and the relay device 25 according to the request. The established TCP connection is used only for the communication between the communication device 11 and the communication device 21. In other words, the relay device 15 and the relay device 25 use the TCP connection just for relaying the data transmitted and received between the communication device 11 and the communication device 21. Therefore, a connection established according to a request from a certain communication device is used exclusively by such a communication device.

In the example illustrated in FIG. 7, under a state in which a connection is established between the relay device 15 and the relay device 25 according to a request from the communication device 11, suppose that a connection is established further between the relay device 15 and the relay device 45 according to a request from the communication device 12. In this case, a description has been made with reference to FIG. 6 that an individual data relay connection is established. Therefore, the communication device 11 and the communication device 12 use different TCP connections for relaying data. Meanwhile, under a state in which the communication device 11 is carrying out a relay transmission designating the relay device 25, when the communication device 12 also carries out a relay instruction designating the same relay device 25, since the already established TCP connection is used exclusively by the communication device 11, a separate communication connection is established.

Third Preferred Embodiment

Next, a description will be made of a third preferred embodiment of the present invention. Also in the third preferred embodiment, in the same manner as in the second preferred embodiment, a connection is carried out between relay devices according to a request from a communication device. However, in the third preferred embodiment, when a connection has already been established between the relay devices, another communication device shares the already established connection. This feature differs from the second preferred embodiment. In the following, a description will be made primarily of aspects that are different from the second preferred embodiment.

FIG. 12 illustrates an example of registration of the relay connection database 151 stored in the relay device 15. As illustrated in FIG. 12, a plurality of clients (communication devices) are associated with one TCP connection. In the example illustrated in FIG. 12, a relay transmission request has generated from two communication devices (ClientX and ClientY), and both of the communication devices designate the same relay device (Relayserver1@sample.net). Therefore, the two communication devices are sharing a TCP connection with a connection number 49583.

The contents of the relay connection databases 251 and 451 stored in the relay devices 25 and 45, respectively, are the same as the relay connection database 151 illustrated in FIG. 12. The relay connection databases 251 and 451 store a status of a TCP connection currently established by the relay devices 25 and 45, respectively.

Figure 13:
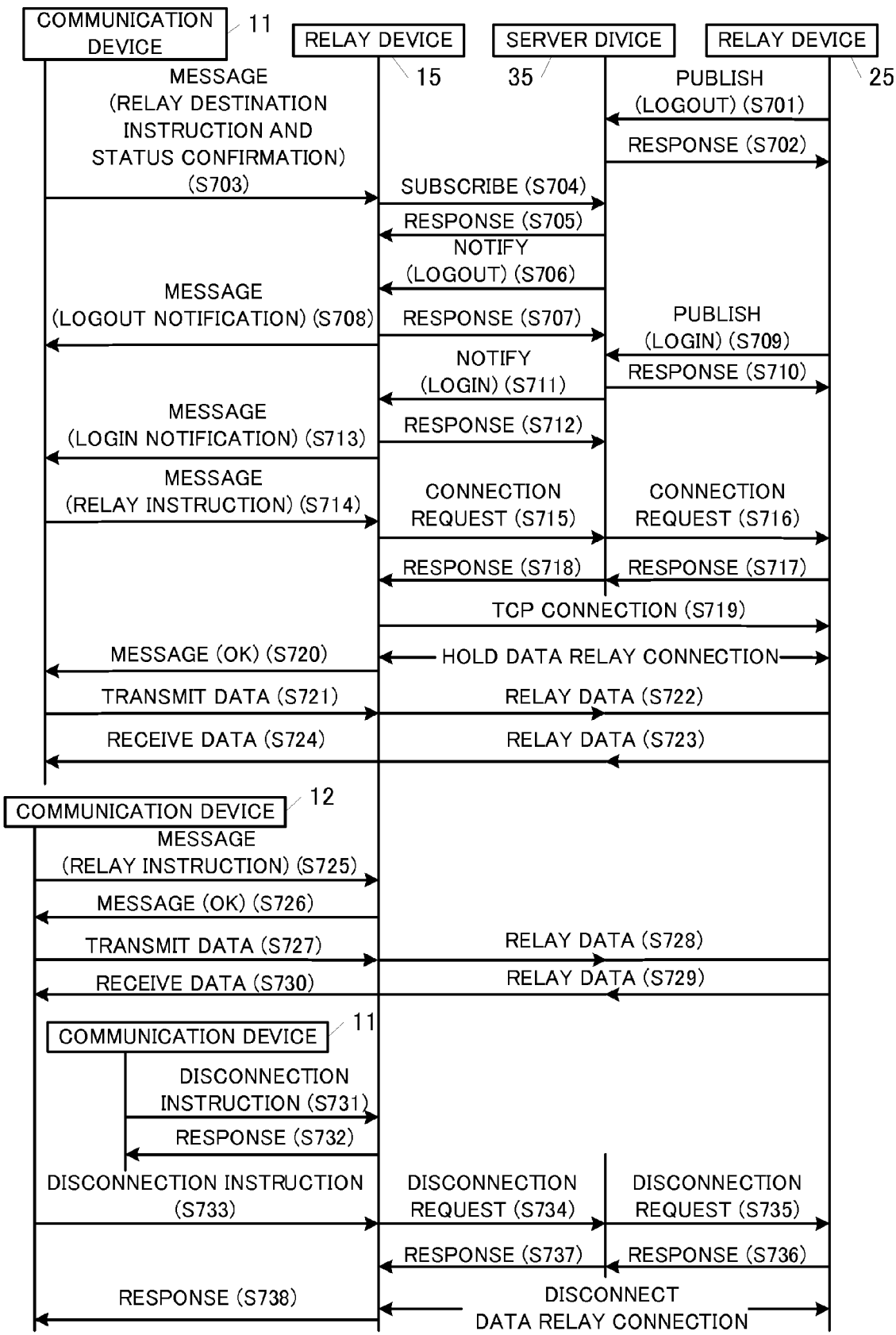
FIG. 13 is a flowchart illustrating a processing carried out in a communication system according to a third preferred embodiment of the present invention.

Next, with reference to FIG. 13 through FIG. 15, a description will be made of a flow of a communication processing carried out in the above-described communication system. FIG. 13 illustrates a flow of a processing of the entire communication system including the communication devices 11 and 12, the relay devices 15 and 25, and the server device 35. Further, in the following description, a description will be made of an example in which the SIP is used for the communication between the relay device 15 and the server device 35, and between the server device 35 and the relay device 25. However, other protocols may also be used.

The processing from step S701 to step S724 in FIG. 13 corresponds to the processing from step S401 to step S424 in FIG. 9. Since the processing is the same, a description will be omitted. That is, the communication device 11 generates a relay transmission request designating the relay device 25, and a TCP connection is established between the relay device 15 and the relay device 25. Then, data is transmitted and received between the communication device 11 and the communication device 21 or the like.

Under such a state, a different communication device 12 carries out a relay transmission request designating the relay device 25 again (step S725). Since the TCP connection is currently being established between the relay device 15 and the relay device 25, the relay device 15 notifies the communication device 12 that a relay transmission of the data can be carried out (step S726). Accordingly, when data is transmitted from the communication device 12 (step S727), the relay device 15 uses the already established TCP connection to relay the data transmitted from the communication device 12 to the relay device 25 (step S728). The relay device 25 also uses the already established TCP connection for relaying the data, which has been transmitted from the communication device 21 or the like to the communication device 12, to the relay device 15 (step S729). The relay device 15 further transmits the received data to the communication device 12 (step S730).

As described above, in the third preferred embodiment, a TCP connection is already established between the relay devices, and when the already established TCP connection can be used for a newly generated relay transmission request, a new TCP connection is not established. A plurality of communication terminals share the same TCP connection. Accordingly, load required for establishing a TCP connection can be reduced, and communication between different networks can be carried out under higher speed. In addition, resources of the relay device can be saved. For example, when carrying out communication via the Internet between a plurality of communication terminals connected to the LAN 10 and a plurality of communication terminals connected to the LAN 20, an increase in the processing speed and saving of the resources are possible and efficient. The above-described third preferred embodiment is also efficient when data volume to be relayed from one communication device is small.

Under a state in which the communication device 11 and the communication device 12 are sharing the TCP connection and carrying out data communication as described above, the communication device 11 transmits a disconnection instruction to the relay device 15 (step S731). Since the communication device 12 is using the same TCP connection, the relay device 15 does not carry out a processing in particular with respect to the disconnection instruction of step S731, and just carries out a response (step S732).

Then, when the relay transmission using the relay device 25 ends, the communication device 12 transmits a disconnection instruction to the relay device 15 (step S733). Since the relay device 15 has already received the disconnection instruction from the communication device 11, the relay device 15 can determine that the shared TCP connection has become unnecessary. Therefore, the relay device 15 transmits a disconnection request for the relay device 25 to the server device 35 (step S734). The server device 35 relays the disconnection request to the relay device 25 (step S735). The relay device 25 transmits a response to the server device 35 (step S736). Then, the server device 35 relays the response to the relay device 15 (step S737). Accordingly, the TCP connection between the relay device 15 and the relay device 25 is disconnected, and the relay device 15 notifies the communication device 11 that the TCP connection has been disconnected (step S738).

Figure 14:
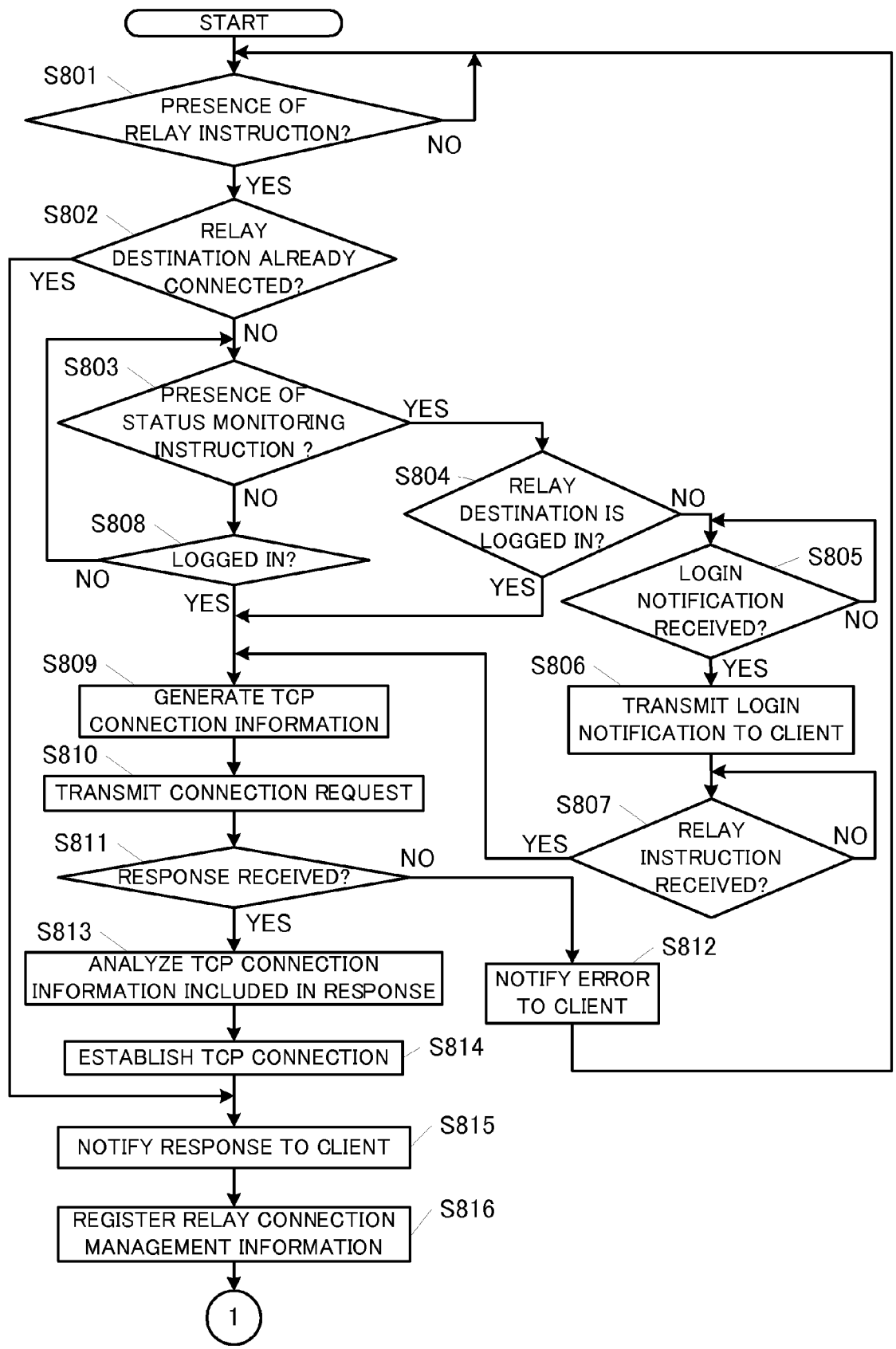
FIG. 14 is a flowchart illustrating a processing carried out in the communication system focusing on a relay device.
Figure 15:
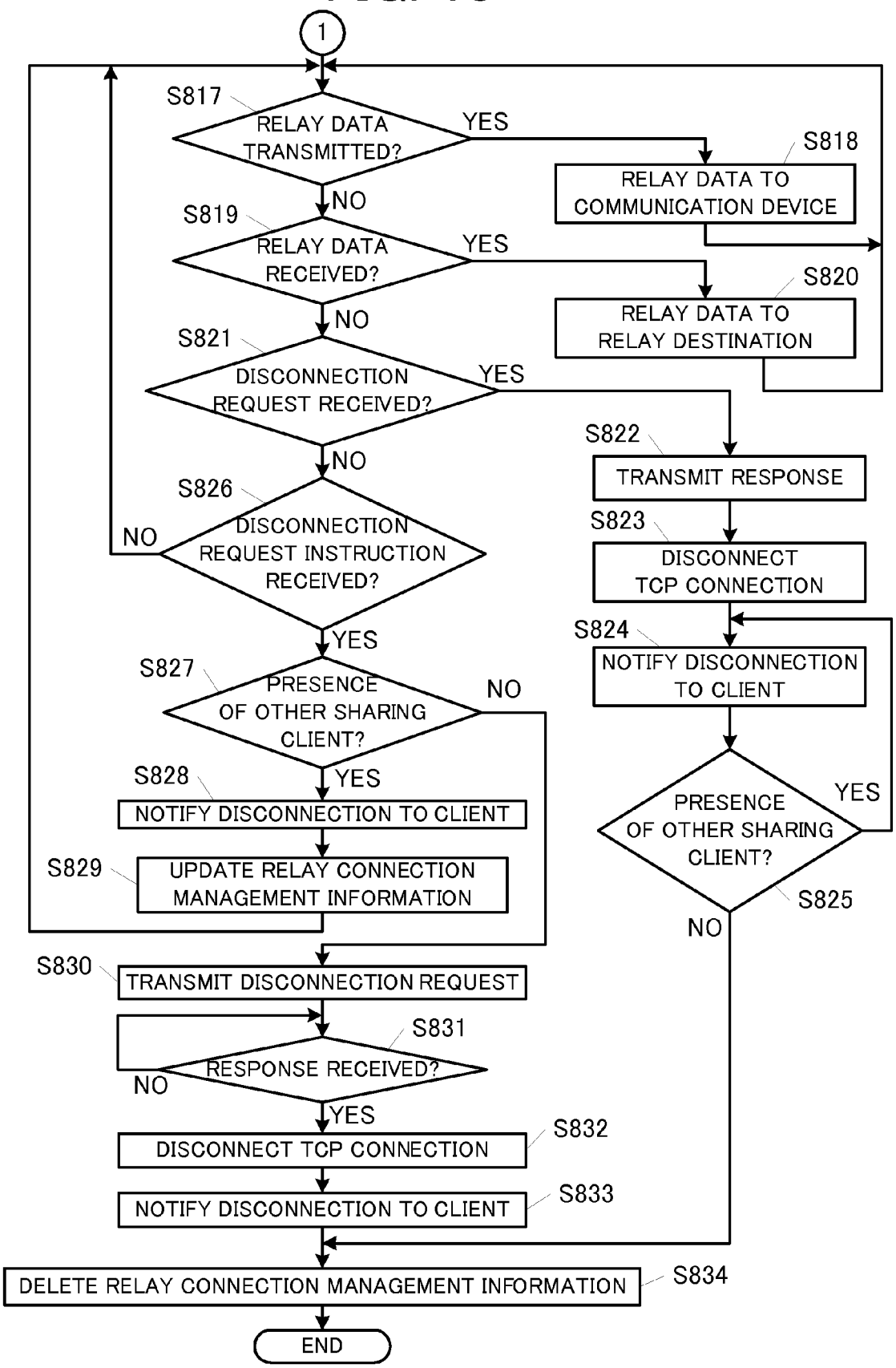
FIG. 15 is a flowchart illustrating a processing carried out in the communication system focusing on a relay device.

FIG. 14 is a flowchart focusing on a processing carried out by the relay device 15 in the processing described with reference to FIG. 13. First, the relay device 15 confirms whether or not a relay instruction from the communication device 11 or 12 or the like has generated (step S801). When a relay instruction has generated (step S801: YES), the relay device 15 confirms whether or not a TCP connection is already established with a relay device of a relay destination (step S802). That is, the relay device 15 confirms whether or not the same relay device has already been designated by another communication device and a communication is being carried out with such a relay device.

When a connection is already established with the already instructed relay destination (step S802: YES), the relay device 15 notifies that data can be relayed to a requesting communication device (step S815). Then, the relay device 15 updates the information of the relay connection database 151 (step S816). That is, since information regarding the TCP connection is already registered in the relay connection database 151, the relay device 15 just adds a client (communication device). In the example illustrated in FIG. 12, for example, when ClientX and a TCP connection with a connection number 49583 are associated and stored, the relay device 15 carries out a processing for adding ClientY to the "client" field of such record.

When a connection is yet to be established with the designated relay destination at step S802, the relay device 15 executes the processing from step S803 to step S814. This processing corresponds to the processing from step S502 to step S513 in FIG. 10. Since the processing is the same, a description will be omitted.

Next, a description will be made with reference to FIG. 15. Under a state in which a TCP connection is established and held, when relay data is transmitted from the communication device 11 or the like (step S817: YES), the data is relayed to the communication device 21 or the like (step S818). When receiving relay data to be relayed to the communication device 11 or the like (step S819: YES), the relay device 15 relays the data to the communication device 11 or the like of the relay destination (step S820). When receiving a disconnection request from the relay device 25 of the relay destination (step S821: YES), the relay device 15 transmits a response (step S822) and disconnects the TCP connection (step S823). As described above, when the TCP connection is disconnected from the relay device 25 of the relay destination, the relay device 15 notifies the communication device to which relay transmission is being carried out that the connection with the relay destination has been disconnected to (step S824). When the disconnected TCP connection had been shared among a plurality of communication devices, the disconnection is notified to all of the communication devices (steps S824 and S825).

When a disconnection request is carried out by the requesting communication device (step S826: YES), the relay device 15 checks whether or not the TCP connection instructed to be disconnected is being shared with another communication device (step S827). When such a TCP connection is being shared with another communication device (step S827: YES), without disconnecting the TCP connection, a formal disconnection notification is carried out to the communication device that has carried out the disconnection instruction (step S828). Then, the relay device 15 updates the information stored in the relay connection database 151 (step S829). That is, the relay device 15 deletes information of the client (communication device) that has requested the disconnection instruction from the information of the shared TCP connection. The relay device 15 manages a currently established TCP connection and communication devices sharing the TCP connection at all times as described above.

When the TCP connection instructed to be disconnected is not shared with another communication device (step S827: NO), the relay device 15 transmits a disconnection request to the relay device 25 (step S830). When receiving a response (step S831: YES), the TCP connection is disconnected (step S832). Then, the relay device 15 notifies the requesting communication device that the connection with the relay destination has been disconnected (step S833) and deletes the information of the TCP connection registered in the relay connection database 151 (step S834).

As described above, according to the third preferred embodiment, when a relay instruction from a communication device generates, a TCP connection is dynamically established with a relay device of a relay destination, and communication can be carried out between private networks. Furthermore, when a relay instruction generates, if a TCP connection is already established with the relay destination, the already established TCP connection is shared. Accordingly, speed of the processing is increased, and resources can be utilized efficiently.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A first relay device capable of communicating with a first communication device connected to a first local area network (LAN) and a second communication device connected to the first LAN, a server device connected to a wide area network (WAN), a second relay device connected to the WAN and a second LAN, the first relay device comprising:
   a holding unit for establishing and holding a transmission control protocol (TCP) relay connection with the second relay device by inquiring of the server device as to a connection status of the second relay device and transmitting a request for connecting the second relay device to the server device when being notified by the server device that the second relay device has logged into the server device;

a storing unit for storing connection information in which the second relay device, the first communication device and the TCP relay connection held in the holding unit are associated with each other, and for storing connection information in which the second relay device, the second communication device and the TCP relay connection held in the holding unit are associated with each other;

a determining unit for determining whether a TCP relay connection associated at least with the second relay device has been held or not based on data, which is received from the first communication device, designating the second relay device, and the connection information stored in the storing unit;

a relay connection controlling unit, when the first relay device receives data designating the second relay device from the first communication device, for transmitting the data to the second relay device via the TCP relay connection held in the holding unit where the determining unit determines that a TCP relay connection associated at least with the second relay device has been held, and, when the first relay device receives data designating the second relay device from the second communication device, for transmitting the data to the second relay device using the same TCP relay connection used by the first communication device to transmit data to the second relay device, and for transmitting the data to the second relay device via a new TCP relay connection which the holding unit is directed to dynamically establish with the second relay device and to hold where the determining unit determines that a relay connection associated at least with the second relay device is yet to be held; and an updating unit for updating connection information stored in the storing unit.

2. The first relay device according to claim 1, wherein the holding unit, when receiving a notification from the first communication device to terminate a relay transmission to the second relay device, refers to the storing unit, and where the other communication device is carrying out relay transmission to the second relay device, the holding unit holds the TCP relay connection with the second relay device, and where no one of the other communication devices is carrying out relay transmission to the second relay device, the holding unit disconnects the TCP relay connection with the second relay device.

* * * * *